(12) United States Patent
Kortmann

(10) Patent No.: US 6,340,267 B1
(45) Date of Patent: Jan. 22, 2002

(54) CONCRETE BLOCK, IN PARTICULAR FOR PAVING A PETROL STATION OR THE LIKE

(76) Inventor: Karl Kortmann, Am Werkshorn 21, 48465 Schuettorf (DE)

( * ) Notice: Subject to any disclaimer, the term of this patent is extended or adjusted under 35 U.S.C. 154(b) by 0 days.

(21) Appl. No.: 09/155,659
(22) PCT Filed: Apr. 9, 1997
(86) PCT No.: PCT/EP97/01760
  § 371 Date: Oct. 1, 1998
  § 102(e) Date: Oct. 1, 1998
(87) PCT Pub. No.: WO97/38168
  PCT Pub. Date: Oct. 16, 1997

(30) Foreign Application Priority Data

Apr. 11, 1996 (DE) ..................................... 296 06 557 U
Dec. 19, 1996 (DE) ..................................... 296 22 083 U

(51) Int. Cl.⁷ ............................................. E01C 11/22
(52) U.S. Cl. ............................................. 404/2; 404/34
(58) Field of Search ............................... 52/169.5, 102, 52/608, 302.4, 302.1; 404/2, 34; D25/112, 113; 4/506, 510

(56) References Cited

U.S. PATENT DOCUMENTS 775,791 A * 11/1904 Austin ........................... 404/2

FOREIGN PATENT DOCUMENTS

| DE | 2414674 | * 10/1975 |
| FR | 2481723 | * 11/1981 |
| FR | 2713254 | * 6/1995 |

* cited by examiner

*Primary Examiner*—Michael Safavi
(74) *Attorney, Agent, or Firm*—Jordan and Hamburg LLP

(57) ABSTRACT

A concrete block, especially for forming a shoulder in a paved surface, a pavement, etc., having a support surface which is shaped in the form of a ramp and a cross-sectional contour which is provided with an upper surface region, which is at least approximately horizontal, a middle surface region with an inclined shape (S) forming the ramp, an at least approximately horizontal lower surface region and with a liquid-guiding gutter. The upper and lower surface regions of the concrete block have a surface depression proximate adjoining side surfaces and adjacent respective apical surface regions which are adjacent to the central surface region.

8 Claims, 21 Drawing Sheets

Figure 1:
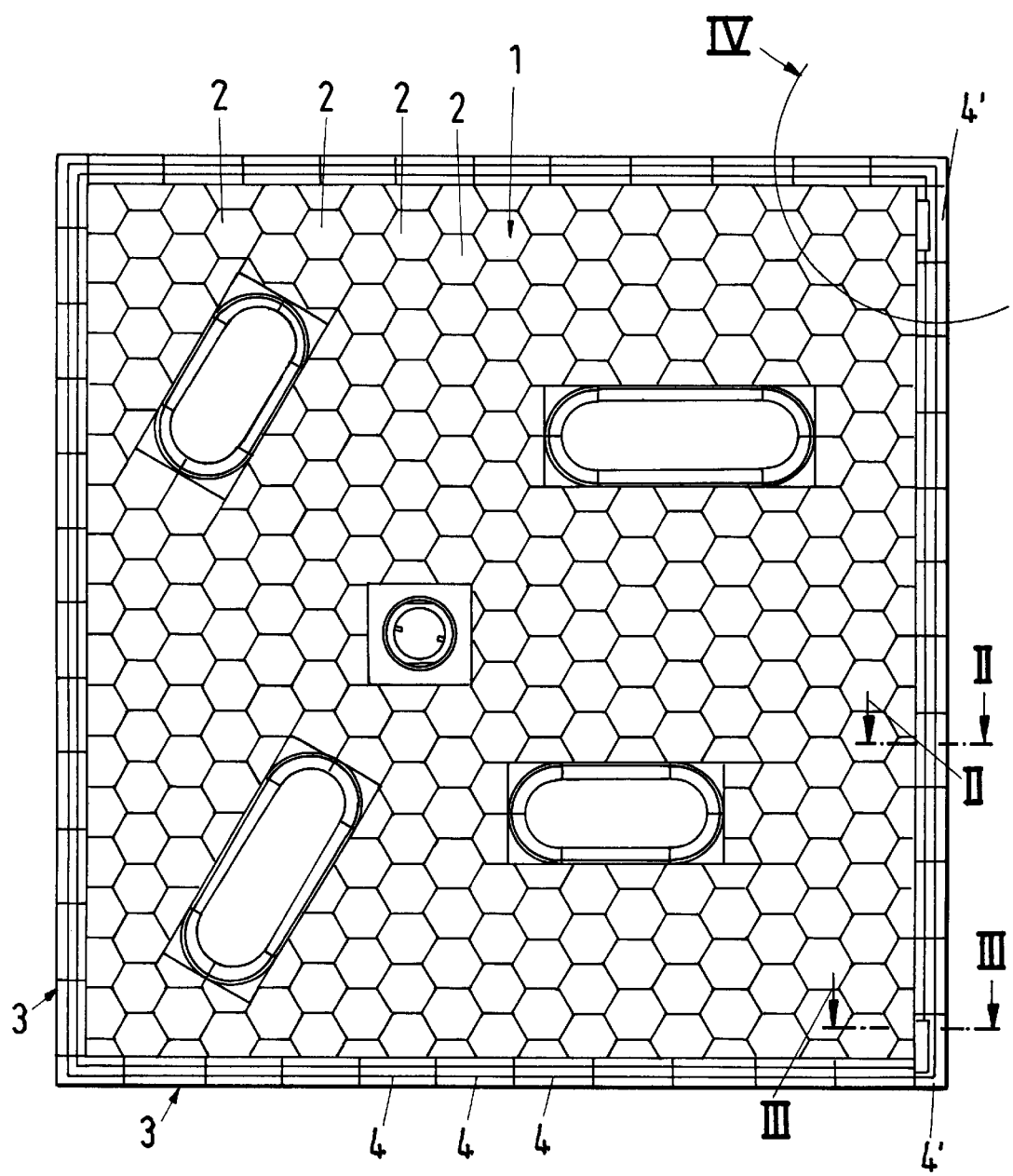

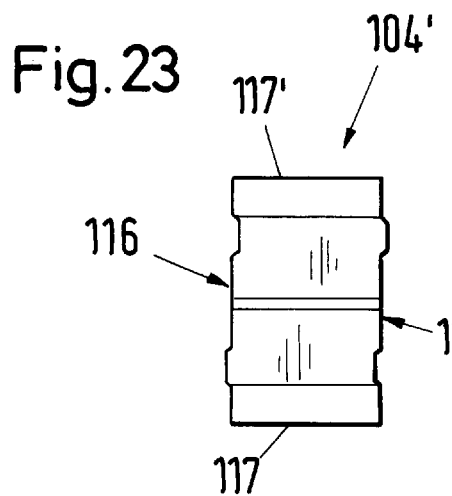
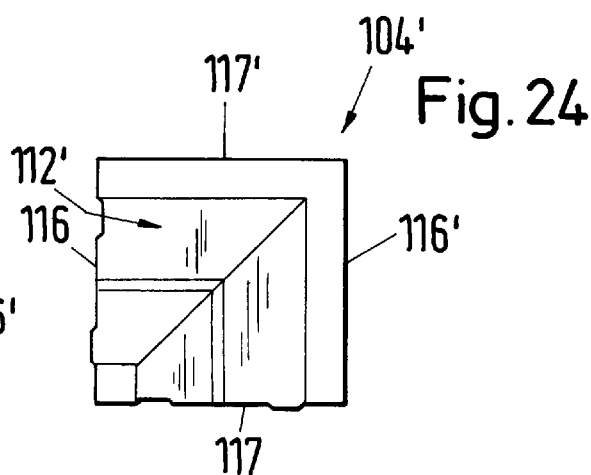
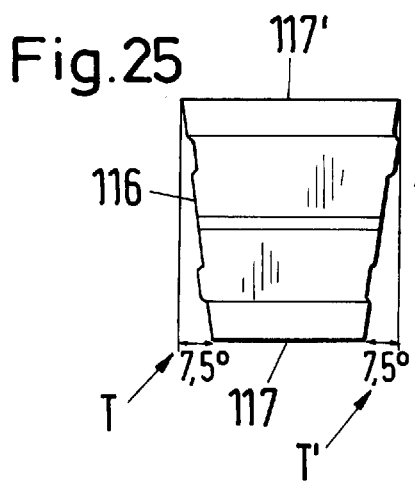
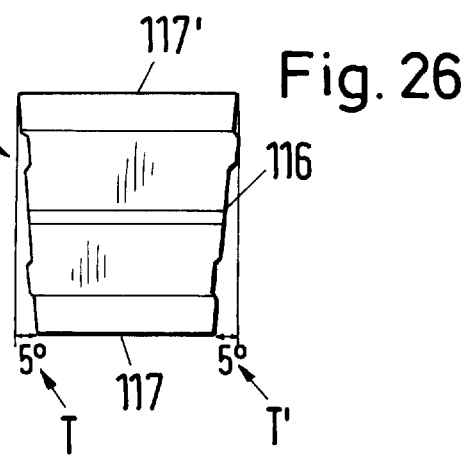
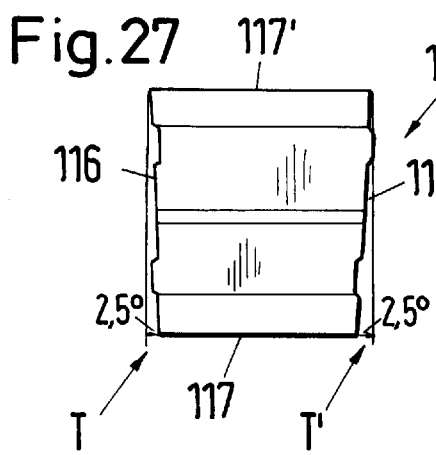
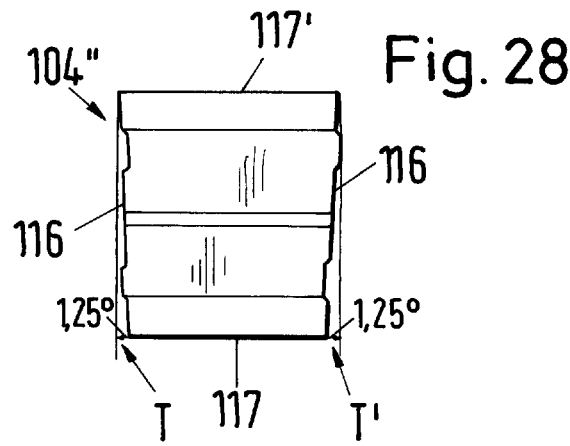

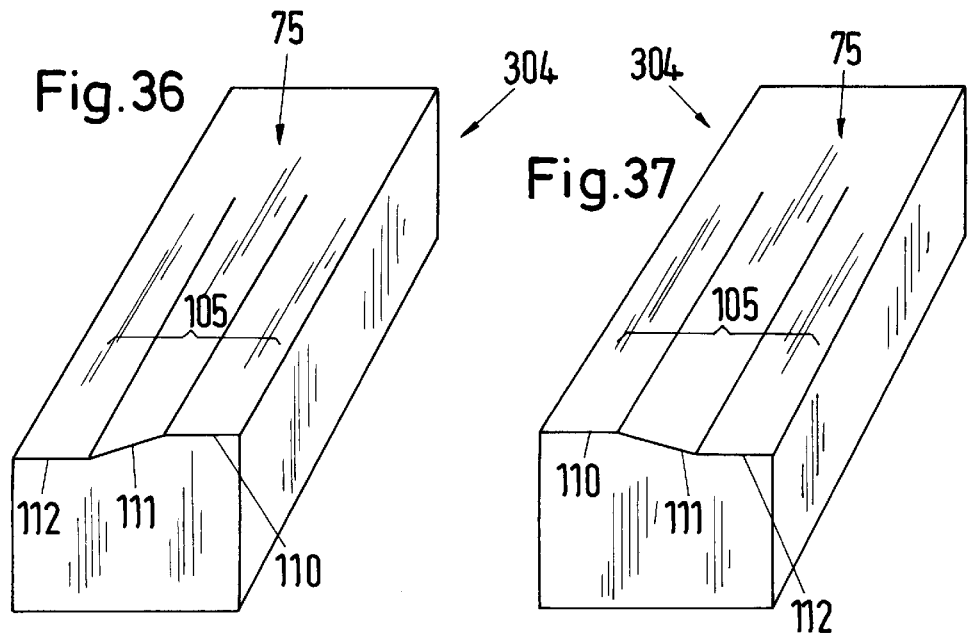
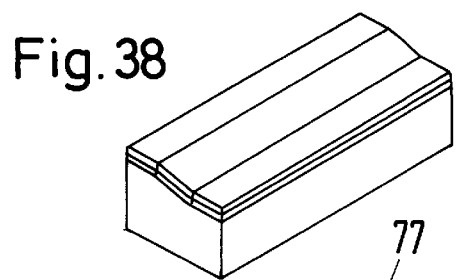
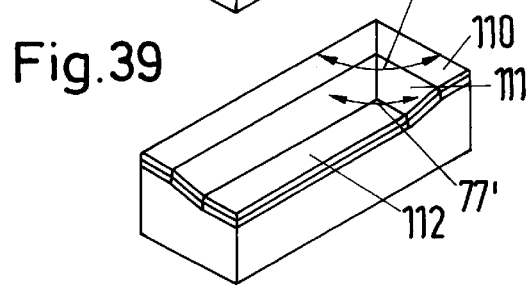
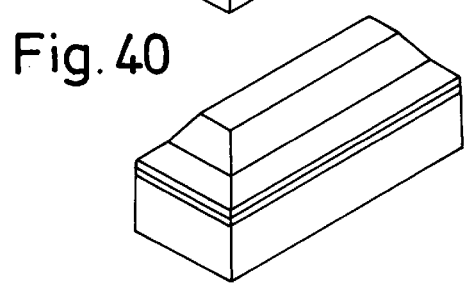

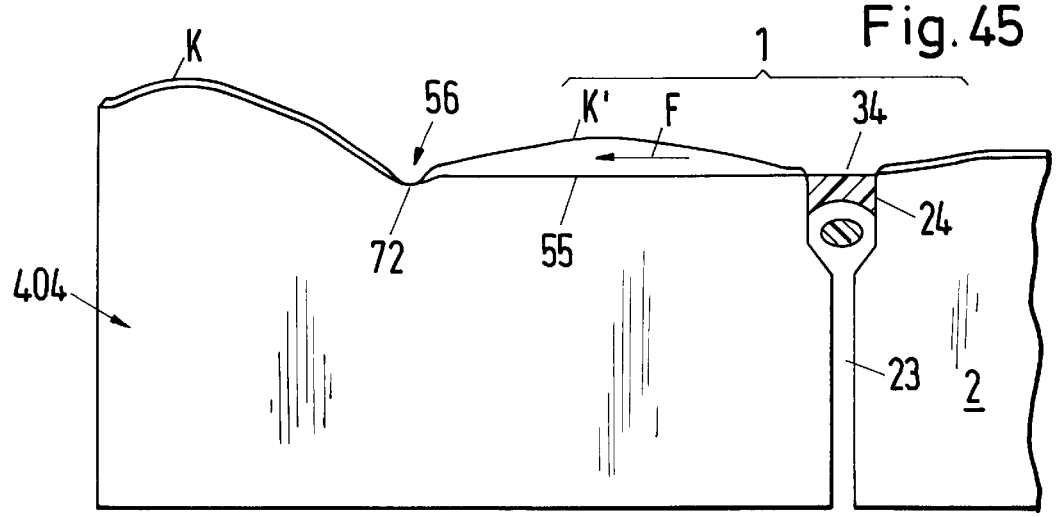
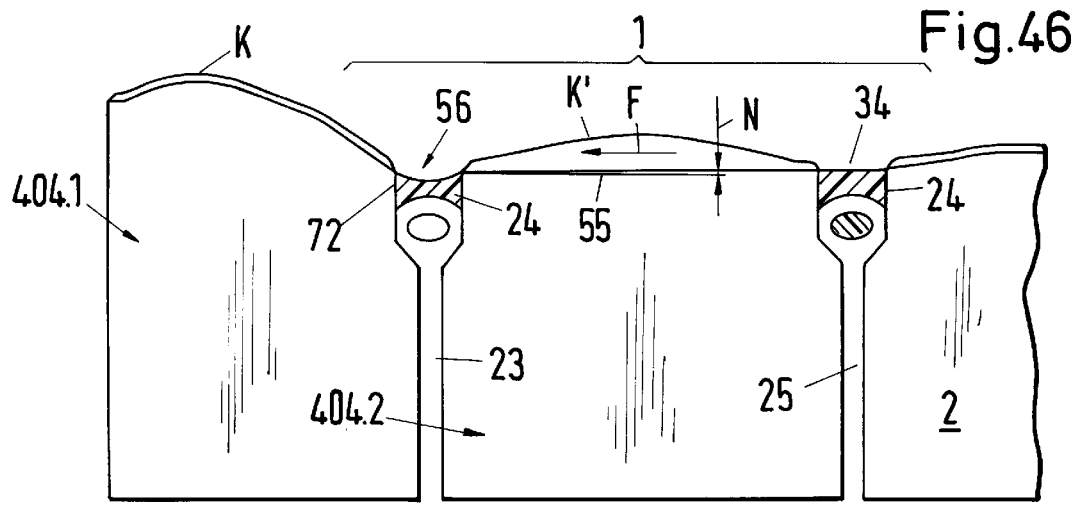
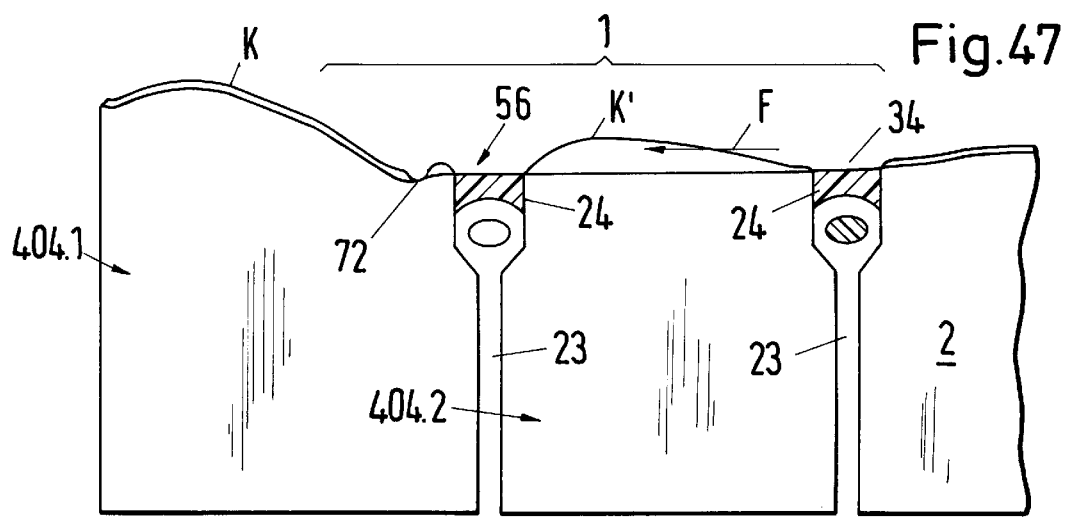

CONCRETE BLOCK, IN PARTICULAR FOR PAVING A PETROL STATION OR THE LIKE

The invention relates to a concrete block, particularly for a paved surface, laid in a compound manner in the region of a gas station or the like

BACKGROUND OF THE INVENTION

Known blocks of this type (U.S. Pat. No. 775,791) are constructed as gutters, which have a ramp profiling and the useful surface of which changes over from an upper surface region, by way of a central oblique region, into a lower surface region in the form of a liquid-guiding gutter, so that the latter, in the installed position of the gutter, takes up a surface liquid, entering from the adjoining areas, such as an adjoining roadway, paved surface or the like. Such gutter blocks are intended to be installed only in a position, in which they are essentially parallel to the roadway and are placed, for example, at the edges of the roadway or the like. Moreover, when subjected to stresses transversely to the laying direction, the blocks, in the upper surface region with the ramp profile, form an obstacle, so that these blocks tend to break off unintentionally and, with that, the liquid-guiding gutter is not suitable for liquid-tight systems. Furthermore, there are point-like contacting and resting regions on such gutter blocks, so that the block can be shifted out of its installed position by tilting moments and the long-term stability and joint tightness, even to an adjacent useful surface, are disadvantageously affected.

SUMMARY OF THE INVENTION

It is an object of the invention to provide a concrete block having a ramp profile shape which offers improved protection to side edge regions against overloading and enables surface forces to be absorbed largely without a tilting moment and with which, when the block placed in a compound paved surface, provides reliable imperviousness against seepage in the region of sealed joints 23 which are filled with a sealant, and the block being further provided with a liquid-guiding gutter, which brings about reliable drainage of the surface.

The concrete block of the present invention has in a region of ramp profile with elevations, forming apical surface regions, and with profile radii, which adjoin these regions, the concrete block, constructed pursuant to the invention, has a support surface, which acts in an installed position as roll profiling for vehicles. In an upper region of side surfaces of the block, this roll profiling is combined with surface depressions, which provide edge protection, in such a manner, that the concrete block, in the position in which it is laid, offers edge regions, which are positioned optimally with respect to loads such that vehicles can drive over the support surface in any rolling direction.

In a construction as double ramp block, the concrete block has an upper apical surface region, starting from which roll profiling extends symmetrically to a central longitudinal plane up to the surface depressions at the edge, so that the block, with these radial shapes integrated into the support surface, as a whole, offers no sharp-edged transition zones whatsoever in the region of its surface and can absorb even horizontally acting shear forces, for example, of street-sweeping machines, snow plows, braking stresses or the like, with little resistance or distribute the forces over large supporting surface areas in such a manner that, with impact-free rolling characteristics, damage to the block is avoided.

In a construction as gutter block, the latter forms a central liquid-guiding gutter between adjacent lower surface depressions. In addition, a groove-shaped, longitudinally directed collecting gutter can be formed in such a manner in this central liquid-guiding gutter that, even when the gutter blocks, which are arranged in rows in the installed position, are shifted slightly, liquid entering the gutter blocks is guided into the collecting gutter in such a manner, that backup of liquid is avoided and, with that, an unintentional distribution of surface water or similar liquids, for example, by vehicles rolling over the gutter block in the longitudinal or transverse direction, is avoided. The liquid-guiding gutters, with the integrated collecting gutters, are advantageously disposed in such a manner in the position, in which the blocks are arranged in rows that, particularly in the area of gas station passageways or the like, on traffic areas, which are to be protected against unintentional seepage, even small amounts of surface water and other contaminations are guided on an advantageously short and, through the collecting gutter, rapidly effective flow path to a drainage part, where they can be disposed of without contaminating the soil. The surrounding paved surface is drained rapidly without sites of residual liquid, so that a useable driving surface is formed, which is not dangerous even under rough operating conditions and can be driven over in any direction, longitudinally and transversely, even in the region of the gutter blocks.

Further details and advantages of the invention arise out of the following description and the drawings, which illustrate several examples of the inventive concrete blocks.

IN THE DRAWINGS

Figure 2:
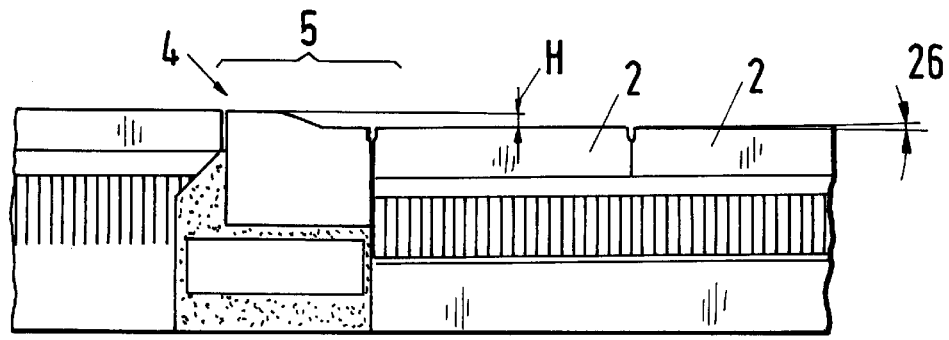
Figure 3:
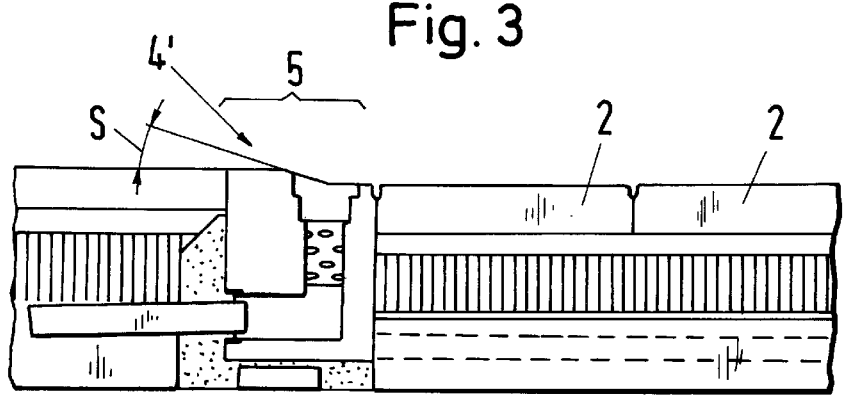
Figure 4:
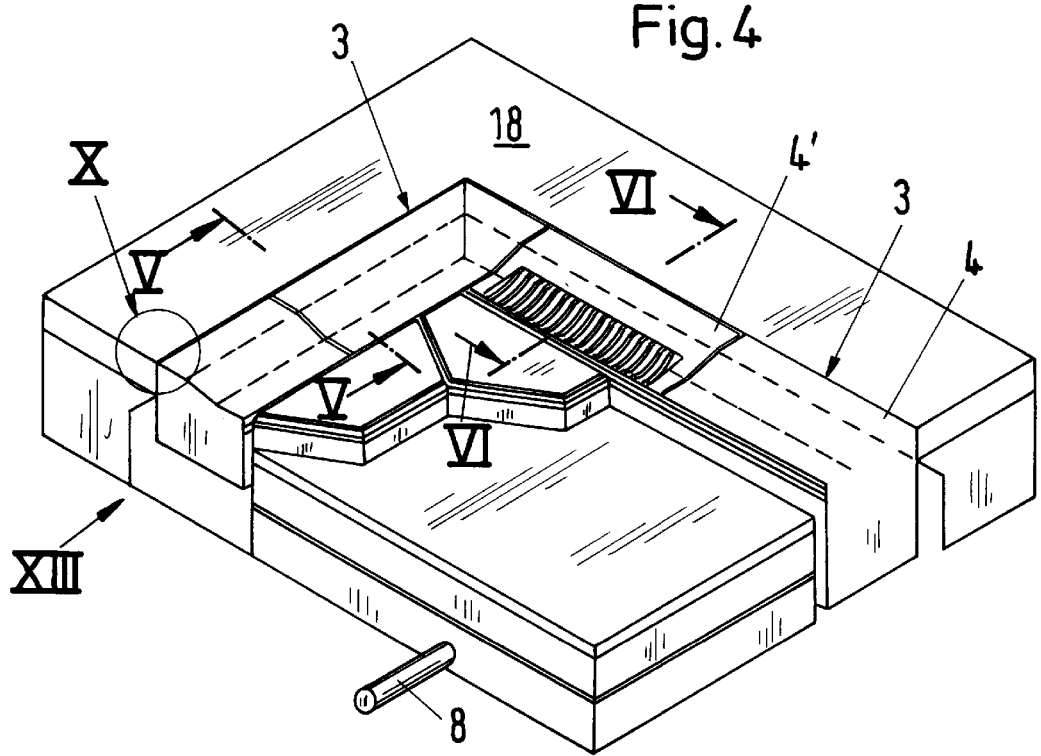
Figure 5:
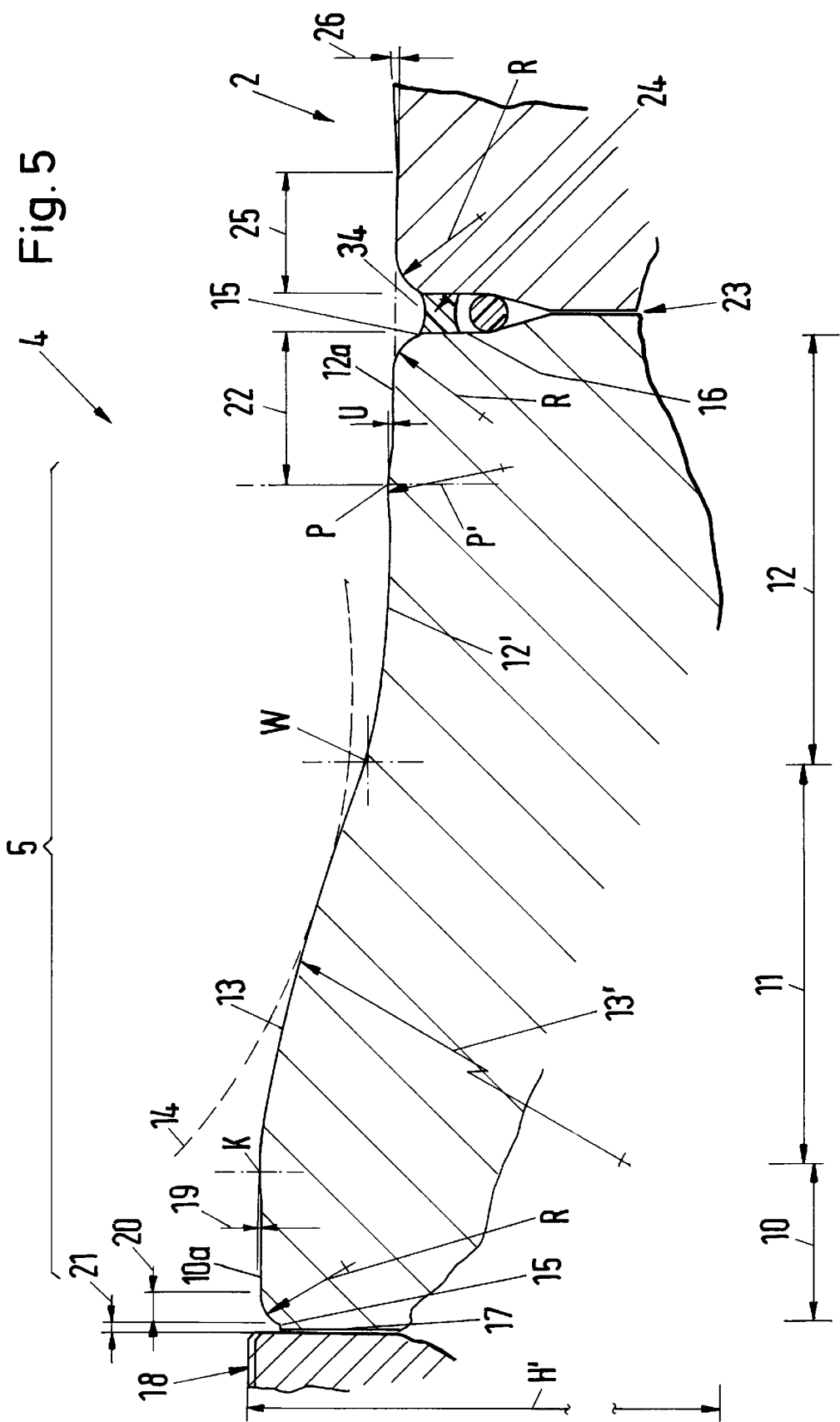
Figure 6:
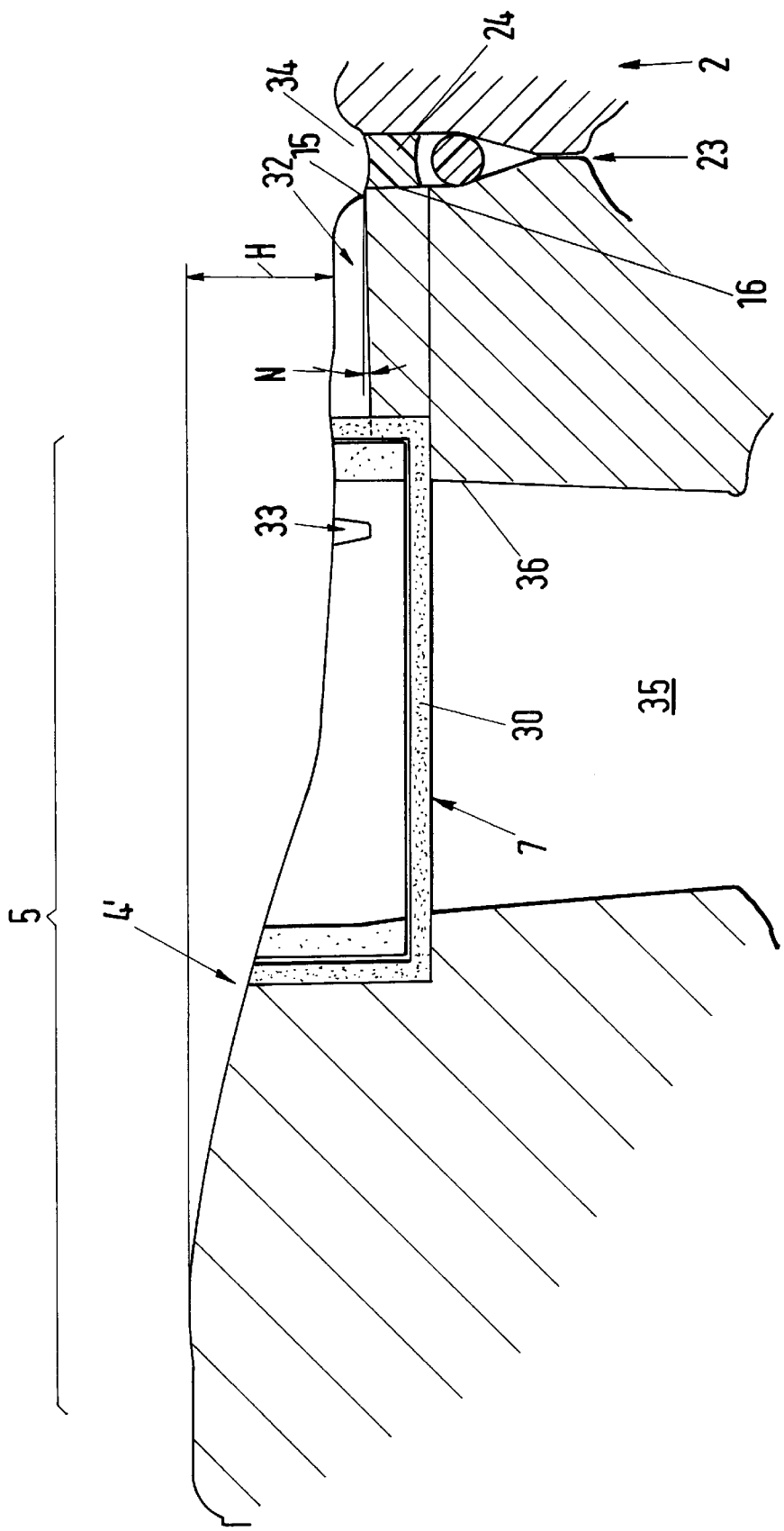
Figure 8:
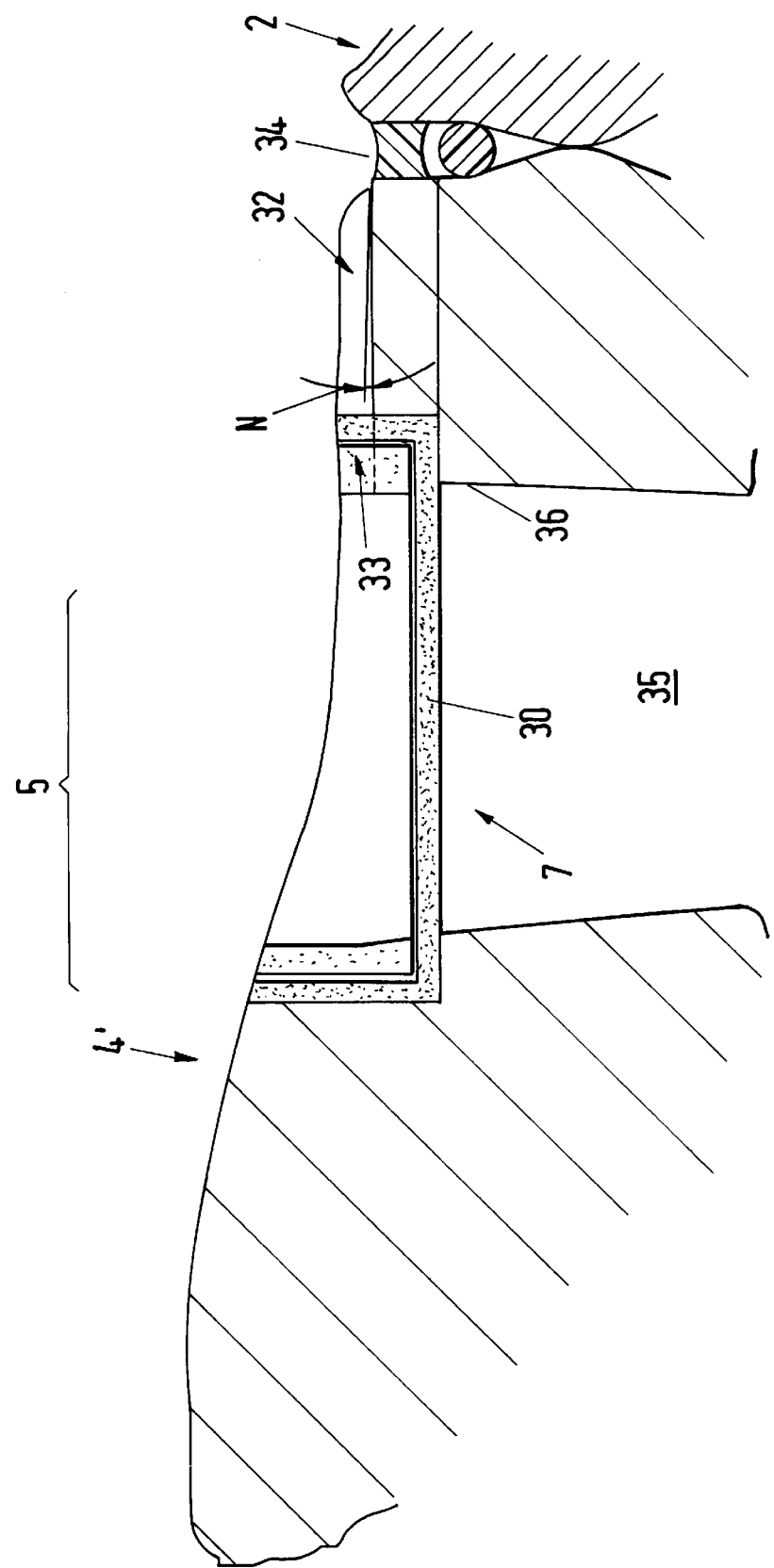
Figure 9:
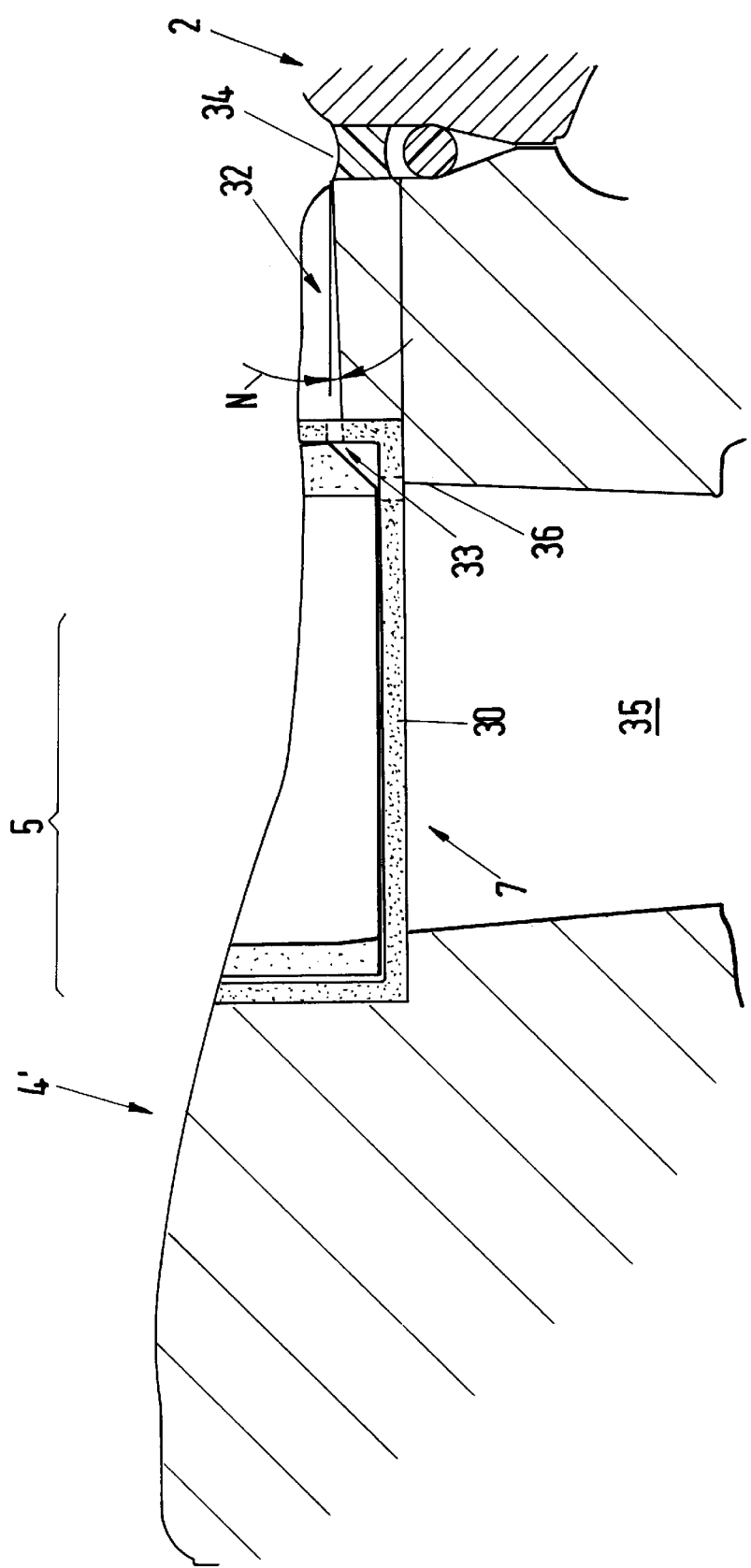
Figure 10:
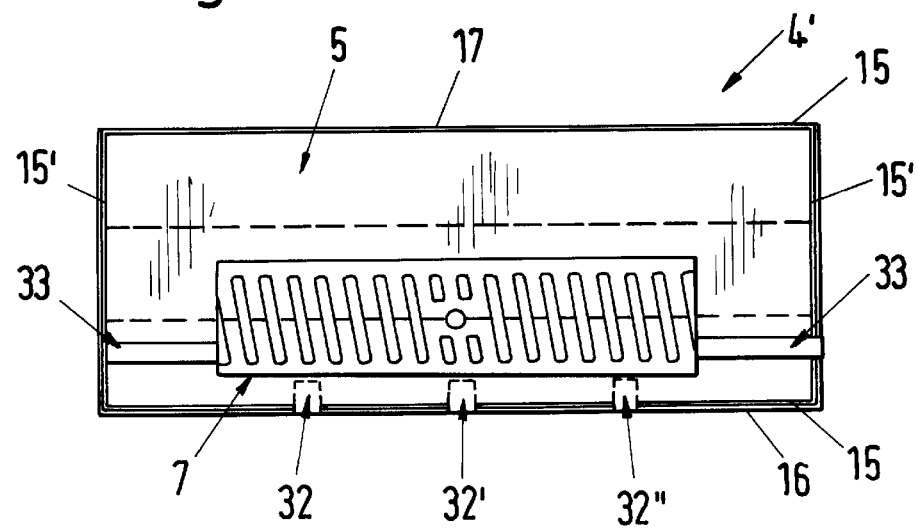
Figure 11:
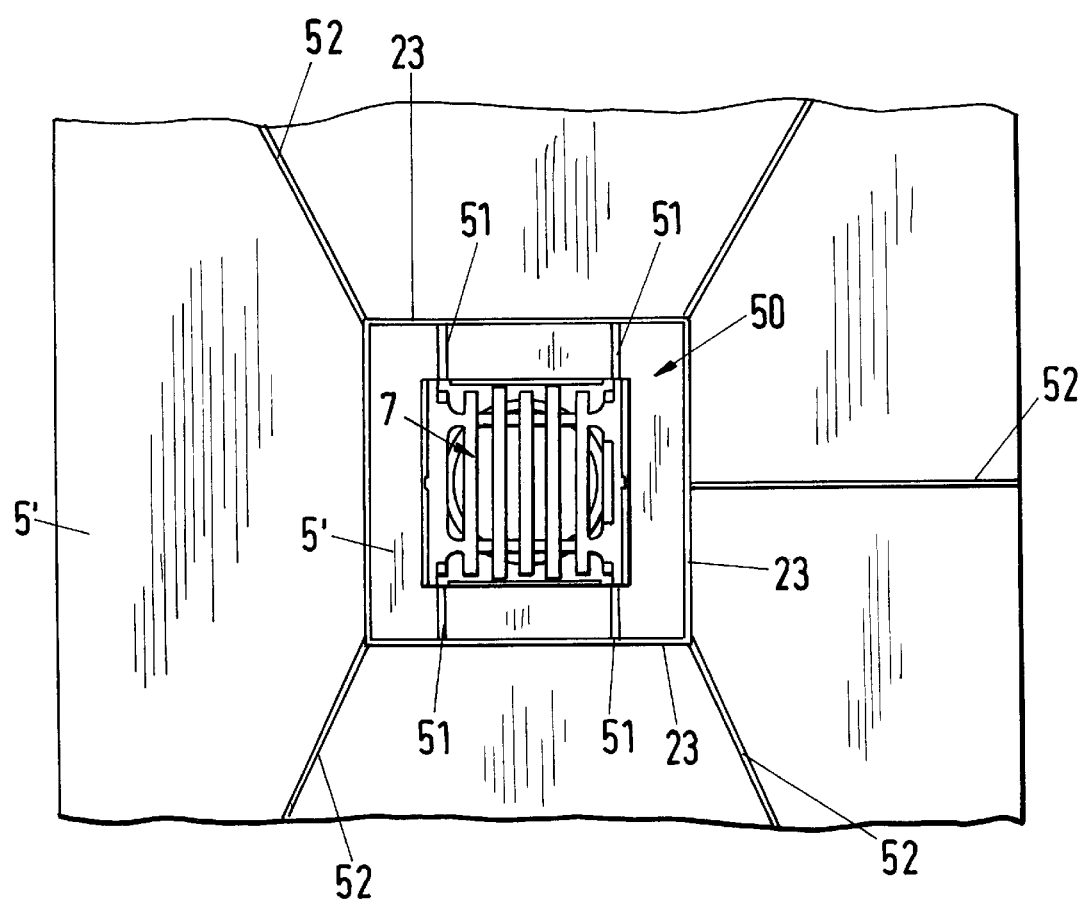
Figure 12:
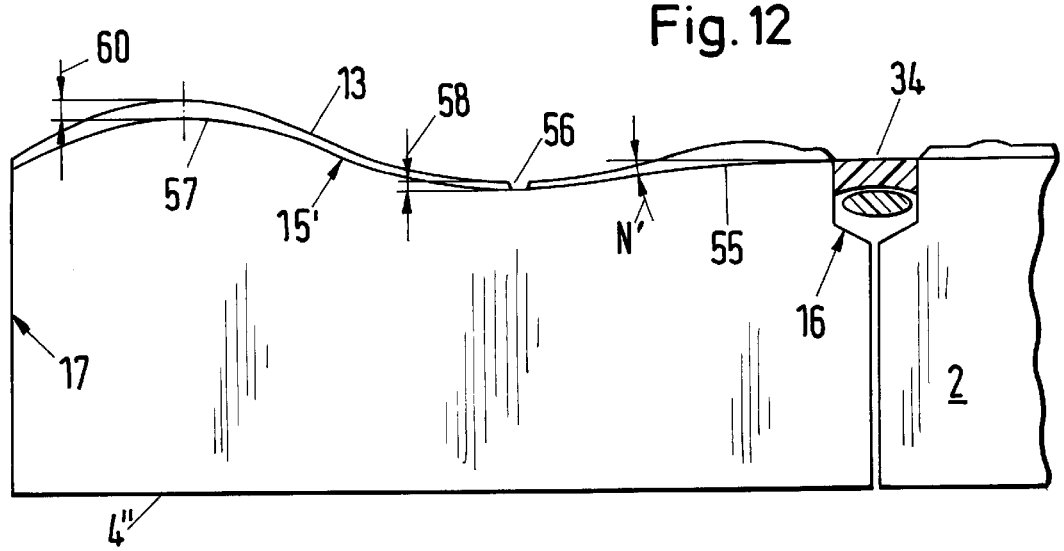
Figure 13:
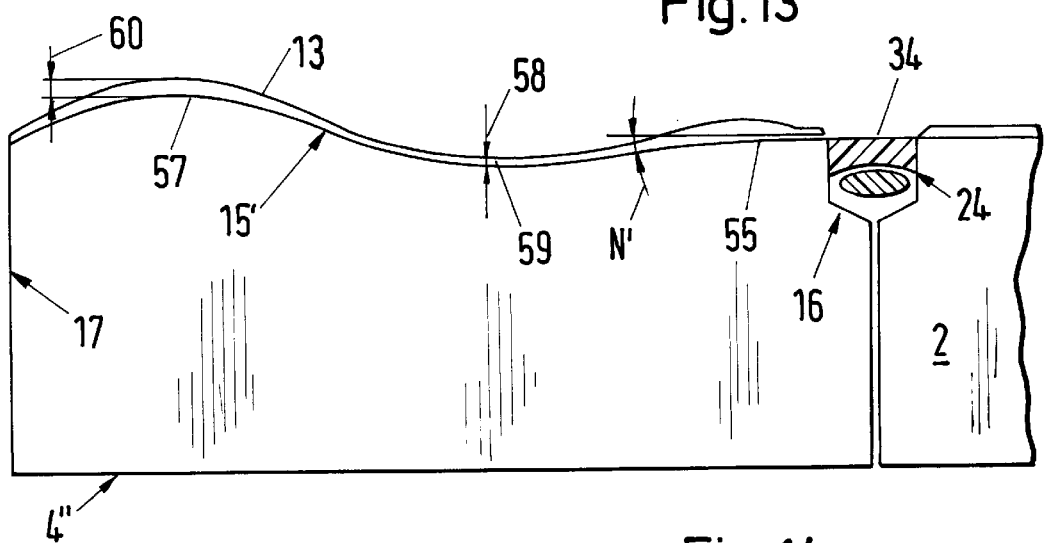
Figure 14:
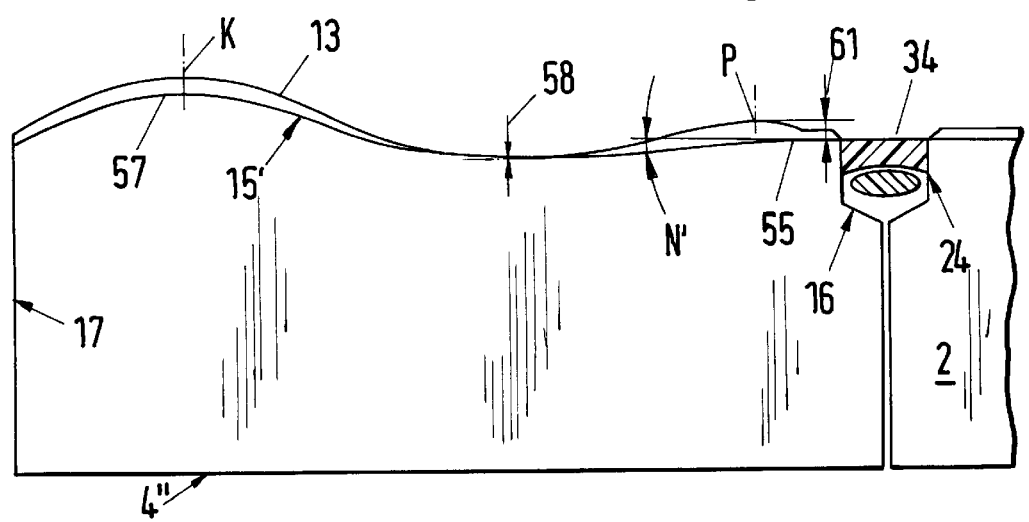
Figure 15:
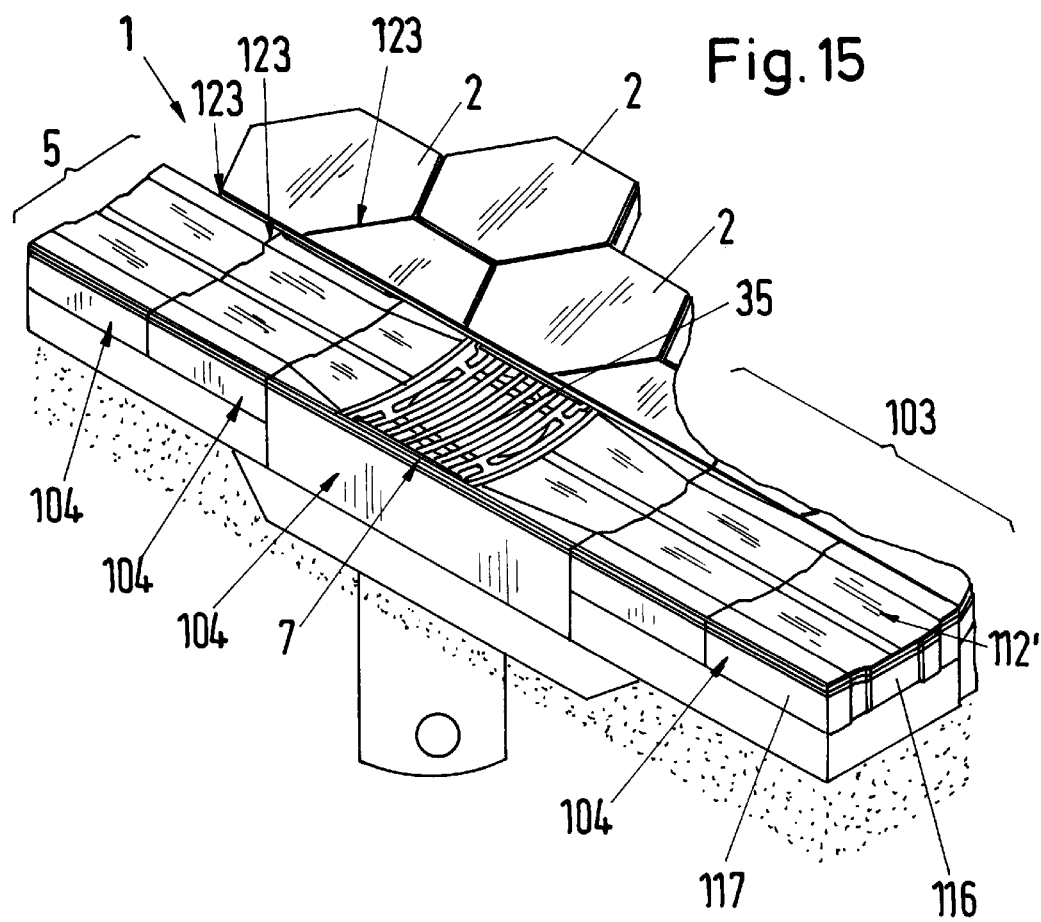
Figure 16:
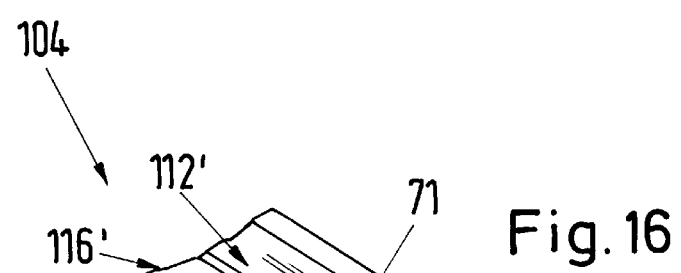
Figure 17:
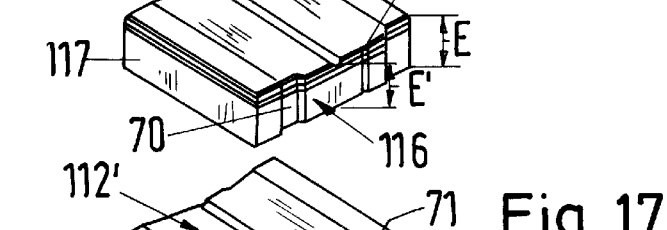
Figure 18:
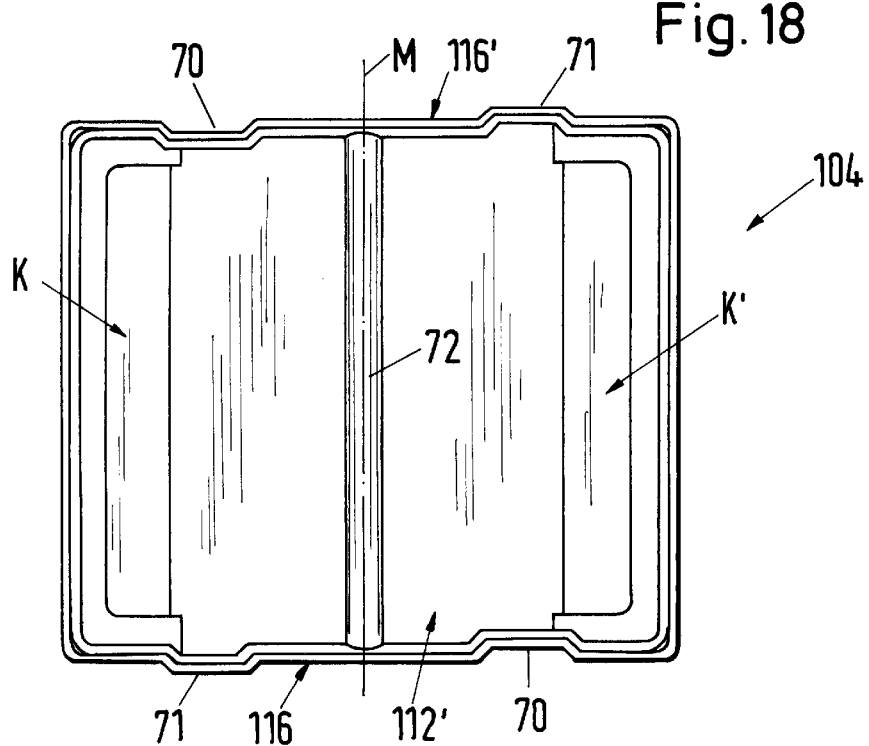
Figure 19:
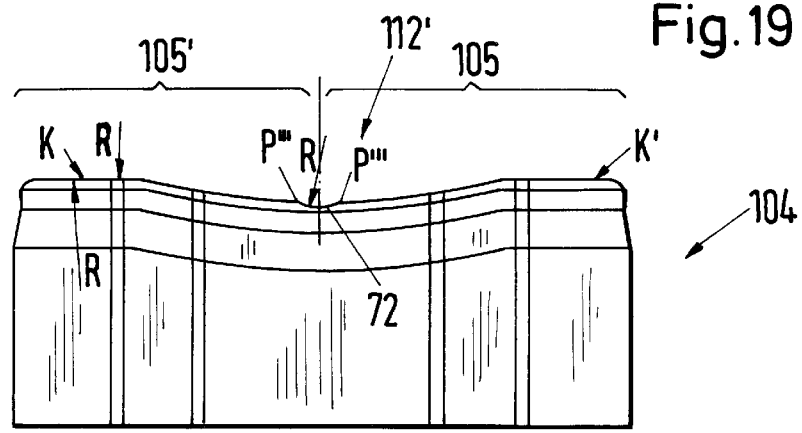
Figure 20:
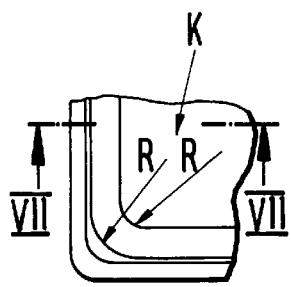
Figure 21:
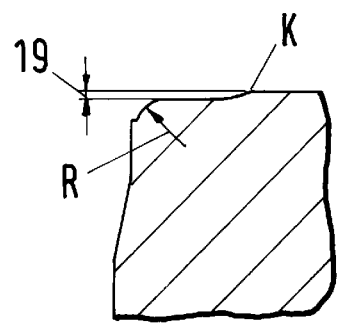
Figure 22:
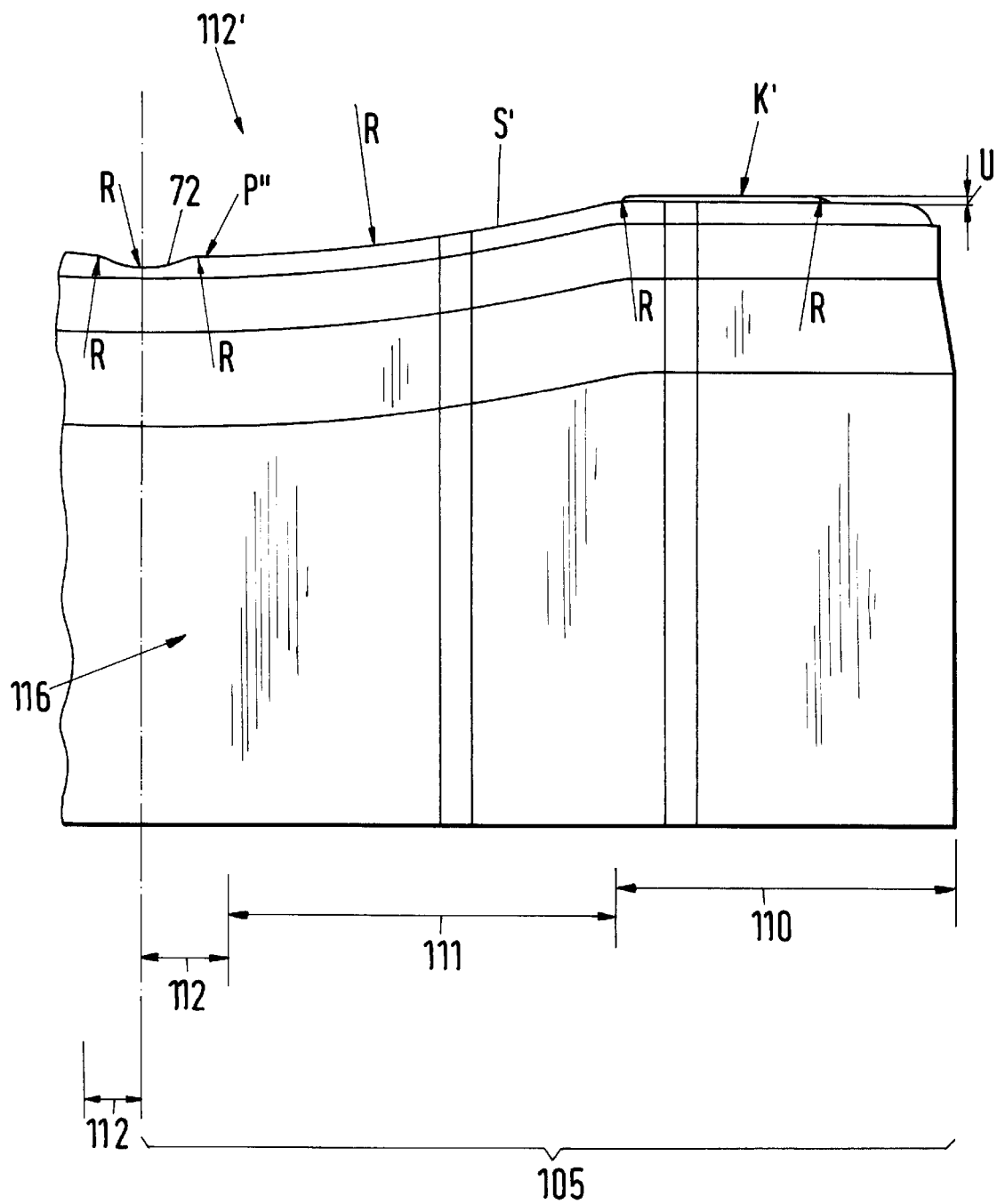
Figure 31:
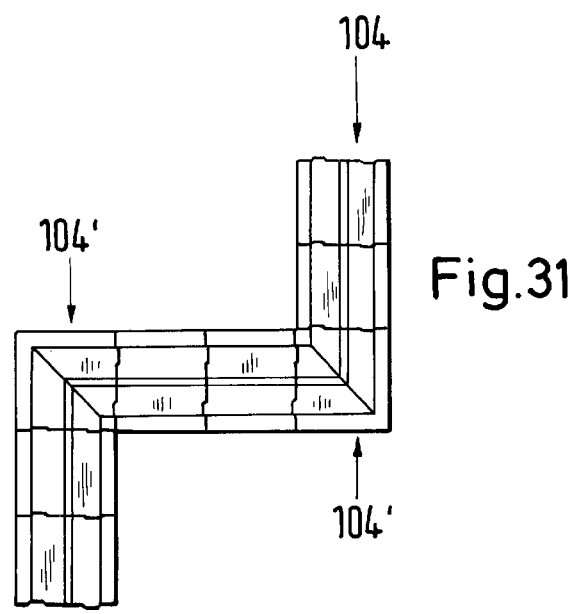
Figure 32:
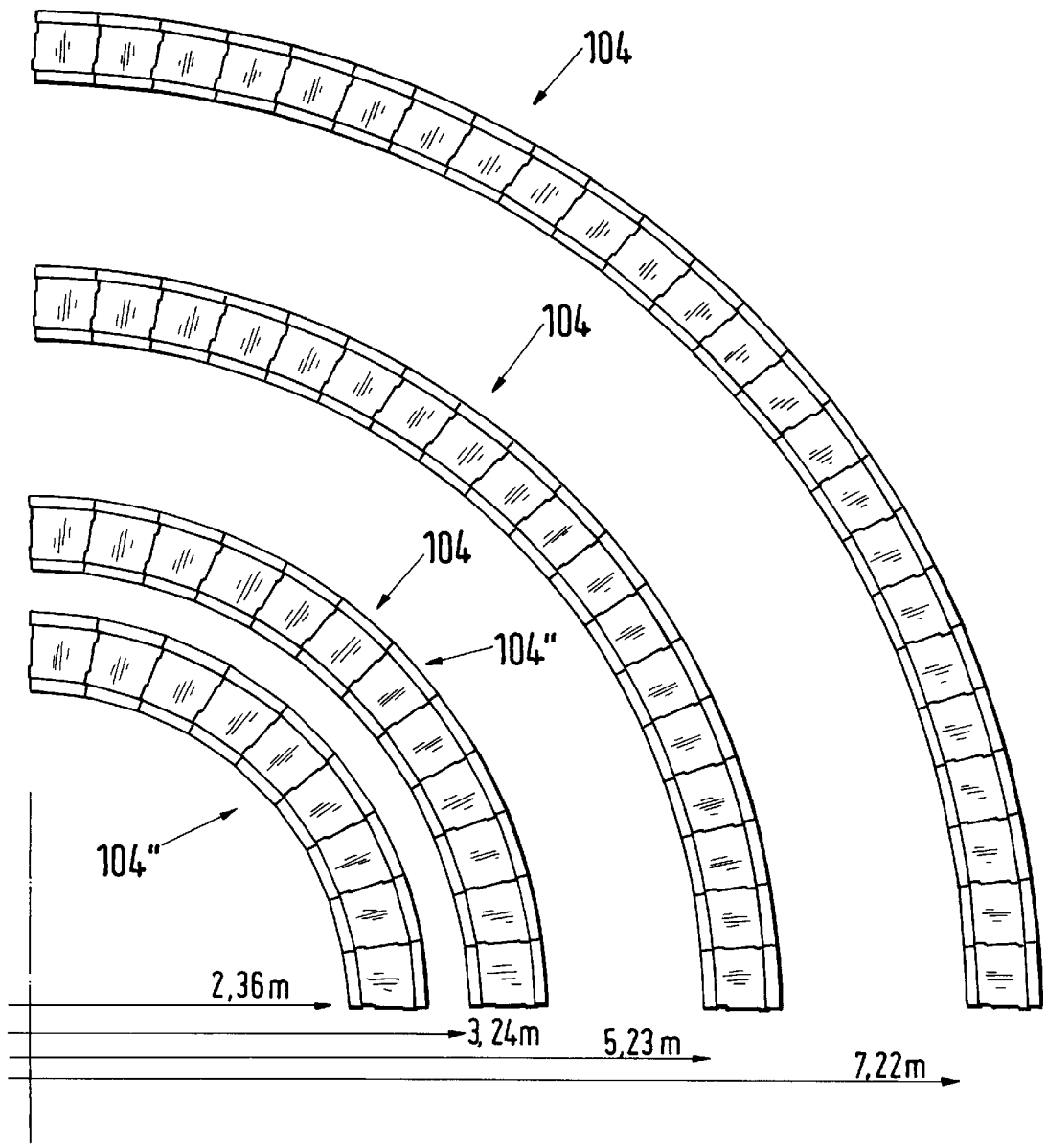
Figure 33:
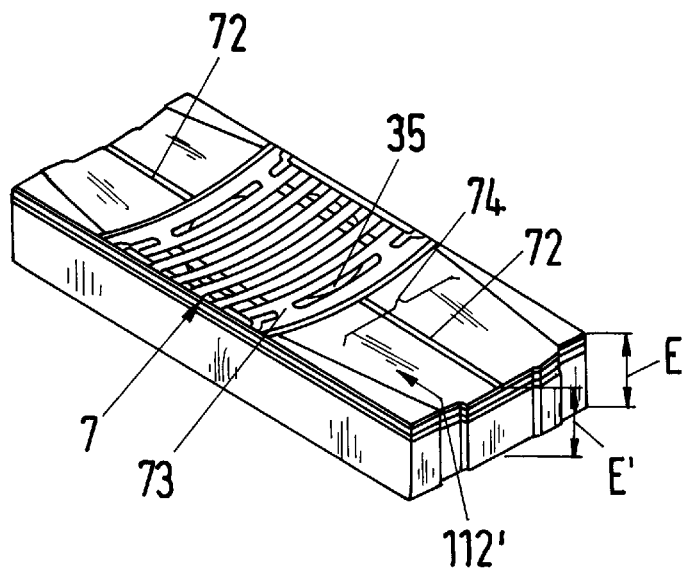
Figure 34:
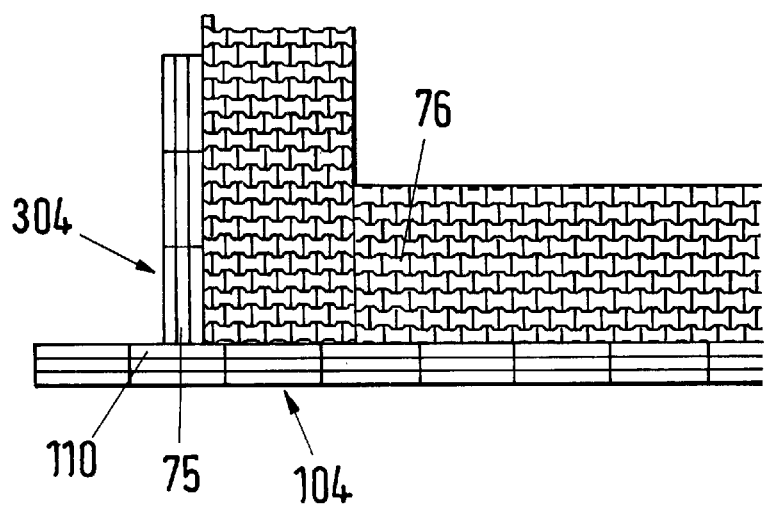
Figure 35:
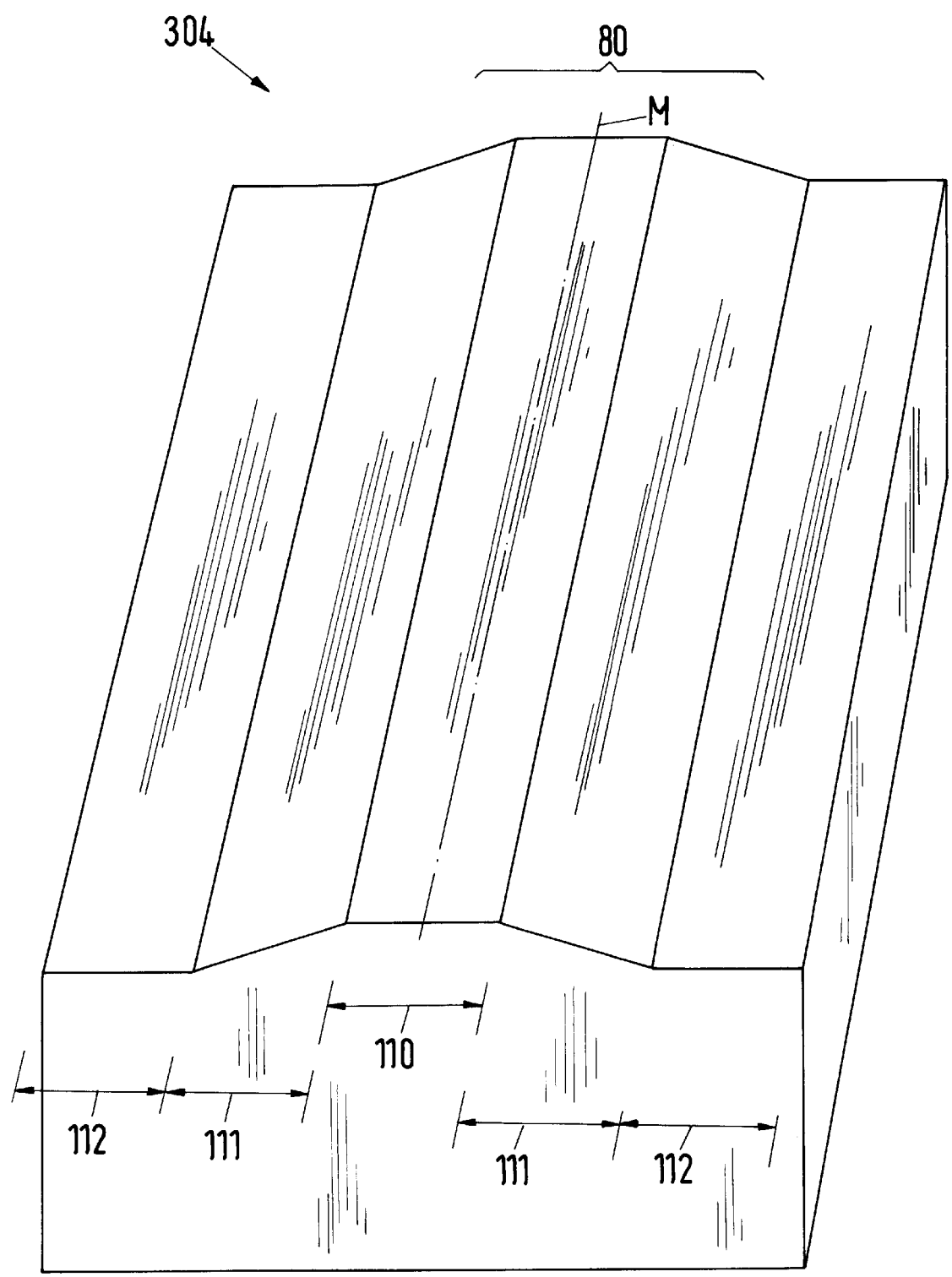

FIG. 1 shows a diagrammatic representation of a liquid-tight paved surface with an edge enclosure, placed in the area of a gas station, FIG. 2 shows a diagrammatic representation of the paving in the area of the edge enclosure along a line II—II in FIG. 1, FIG. 3 shows a diagrammatic representation similar to that of FIG. 2 along the line III—III in FIG. 1, FIG. 4 shows a perspective sectional representation in a corner region of the paving of FIG. 1 in the direction of arrow IV, FIG. 5 shows an enlarged sectional representation of a concrete block, forming an edge enclosure, in an inventive construction along a line V—V in FIG. 4, FIGS. 6 to 9 show sectional representations of the concrete block of FIG. 5 in an embodiment with an inlet box along a line VI—VI in FIG. 4, FIG. 10 shows a plan view of the concrete block, constructed with the inlet box, with several liquid-guiding gutters constructed as inlet grooves, FIG. 11 shows a plan view of a concrete element, similar to FIG. 10, in an installed position in a driving area, surrounded by concrete mixed on site, FIGS. 12 to 14 show diagrammatic representations of the concrete block in a side view in the direction of arrow XIII of FIG. 4, FIG. 15 shows a diagrammatic representation of a liquid-tight paved surface with several double ramp-shaped gutter blocks, FIGS. 16 and 17 show perspective detailed representations of one of the gutter blocks with different dimensions, FIG. 18 shows a plan view of the gutter block of FIG. 15, FIG. 19 shows a side view of the gutter block of FIG. 18, FIG. 20 shows an enlarged sectional representation of the gutter block of FIG. 18 in a corner region, FIG. 21 shows a sectional representation along a line VII—VII in FIG. 20, FIG. 22 shows an enlarged sectional representation of the gutter block of FIG. 19, FIGS. 23 to 28 show plan views of gutter blocks having different peripheral contours, FIGS. 29 to 32 show examples of laying gutter blocks, which are intended to be a kit, FIG. 33 shows a perspective view of the gutter block in an embodiment with an inlet box, FIG. 34 shows a plan view of an example of a driving area with concrete blocks, FIG. 35 shows a perspective detailed representation of a concrete block, constructed as a double ramp block, as part of the kit, FIGS. 36 and 37 show perspective representations of the ramp block with an additional horizontal surface region in its support surface, FIGS. 38 to 40 show perspective detailed representations of ramp blocks of the kit with different profilings as supplementary shape, FIGS. 41 to 44 show side views of the ramp blocks, similar to those of FIGS. 19 and 22, with a modified roll profiling in the region of the liquid-guiding gutter and FIGS. 45 to 47 show side views of the ramp block, similar to those of FIGS. 12 to 14, in the installed position.

In all of the subsequent examples and Figures, the same reference numbers have been used for identical or similar parts, the latter not being described in detail once again in each case.

DETAILED DESCRIPTION OF THE PREFERRED EMBODIMENTS

Referring to FIG. 1, a paved surface with hexagonal blocks 2, which is labeled 1 as a whole, is shown in plan view. At its outer periphery, the paved surface 1 is provided with an edge enclosure 3. This edge enclosure 3 is formed essentially by cuboid concrete blocks 4 as shown in FIGS. 2 to 4, which are provided in the nature of ramp blocks with a contoured support surface 5, which in turn, in the laid position shown, forms a height difference H with respect to the hexagonal blocks 2 as shown in FIG. 2. Moreover, the whole of the region of the paved surface 1 shown in FIG. 1 is enclosed at the periphery with the ramp profile blocks 4 and surface liquid is prevented from leaving the area of the paved surface 1. In an advantageous embodiment, concrete blocks 4' are provided in corner regions of the edge enclosure and provided with an inlet box 7 as shown in FIG. 3 and, with that, a controlled discharge of surface liquid into a sewage system 8 is made possible.

Referring to FIG. 5, in a known adaptation, the ramp profile of the support surface 5 has an upper surface region 10, a central surface region 11 with an inclined shape S forming the ramp and a lower surface area 12.

The present invention provides a configuration wherein the concrete block 4 is provided with a cross-sectional contour which, in regions of the upper surface 10 and the lower surface area 12, is shaped to provide edge protection at side surfaces 16 and 17 in such a manner, that at depressed portions of the support surface having regions contoured differently in cross section, a load-protected transition zone to adjoining parts of the driving area is created.

Referring to FIGS. 5 to 9, the concrete block 4, in the central surface area 11, is constructed with an arc contour 13 with a radius 13' which follows the inclined shape S and is convex in cross section and, at one end, towards the upper surface region 10, forms an upper contour apex K elevated a height 19 above an upper depressed portion 10a which extends substantially horizontally. At the other end of the central surface region 11 is a transition region to the lower surface area 12 wherein the radial arc contour has a point of inflection W, starting from which the profiled shape changes to a concave surface area 12' and then to a convex profiled shape region P with a radius P' and a height U above a lower depressed portion 12a which extends substantially horizontally. This profiled shape region P protrudes from the lower surface area 12. With this profiled shaping, this region of the support surface 5, together with the surface 12', forms a liquid-guiding gutter, which extends parallel to the two side surfaces 16, 17 on the support surface 5.

With the above described cross-sectional configuration, an exceptionally effective roll profiling is furthermore created on the concrete block 4, 4'. With this roll profiling, an optimum rolling process for a wheel 14 of a vehicle, which is illustrated diagrammatically by a broken line in FIG. 5, is attained in such a manner, that compressive forces are introduced in the center part of the block at a distance from the joint 23, that tilting stress on the block is minimized and that, due to the arched contour of the support surface 5, a vibration-free movement of the vehicle without load impacts is possible when the vehicle drives over the paved surface 1.

The installed position of the concrete block 4 of FIG. 5 illustrates that the upper surface area 10 and the lower surface area 12 in each case, via a radial arc R and a cross member region 15 adjoining the radial arc R, adjoin the respective side surface 16, 17 of the block 4. The upper surface area 10 is disposed in the immediate vicinity of the pavement 18, the contour apex K of the radial arc contour 13 extending below the pavement plane 18, so that, with this construction, an overall largely protected edge zone is formed in the radial area 20 or a width 21 of the cross member region 15 between the respective concrete blocks 4 and the pavement 18.

In the region of the lower surface area 12, the profiled shape region P is disposed at a distance 22 from the inner side surface 16 of the block 4 in such a manner, that a defined force introducing area is formed in the region of the profiled shape P for the rolling wheel 14 and, with that, the region close to the sealedjoint 23, which is in danger of breaking, is protected so that chipping of the concrete material and damage to a seal 24, which is disposed within the sealed joint 23, are adequately reliably avoided.

The above-described roll profiling of the concrete block 4 enables an overall tilting moment-free transition of the wheel 14 from the region of the pavement 18 having an installed height H' into the region of the hexagonal block 2, on which, after a transition region 25, a wheel 14 can roll on an inclined shape 26.

In FIGS. 6 to 9, the concrete block 4' is shown in a second embodiment. The inlet box 7 has a box shape 30 and is integrated into this block. A contour of the box shape 30 at an upper side is adapted largely to the previously described roll profile of the concrete block 4'. In an advantageous construction, the liquid-guiding gutter, which is constructed as an inlet groove 32, 33, is molded in the support surface contour 5 of the concrete block 4', the inlet groove 33 extending perpendicularly to the plane of the drawing, while the inlet groove 32, starting from the region of the cross member 15 at the side edge 16, extends up to the respective inlet box shape 30 and here discharges into the passage opening 35 at an upper side edge region 36.

Figure 7:
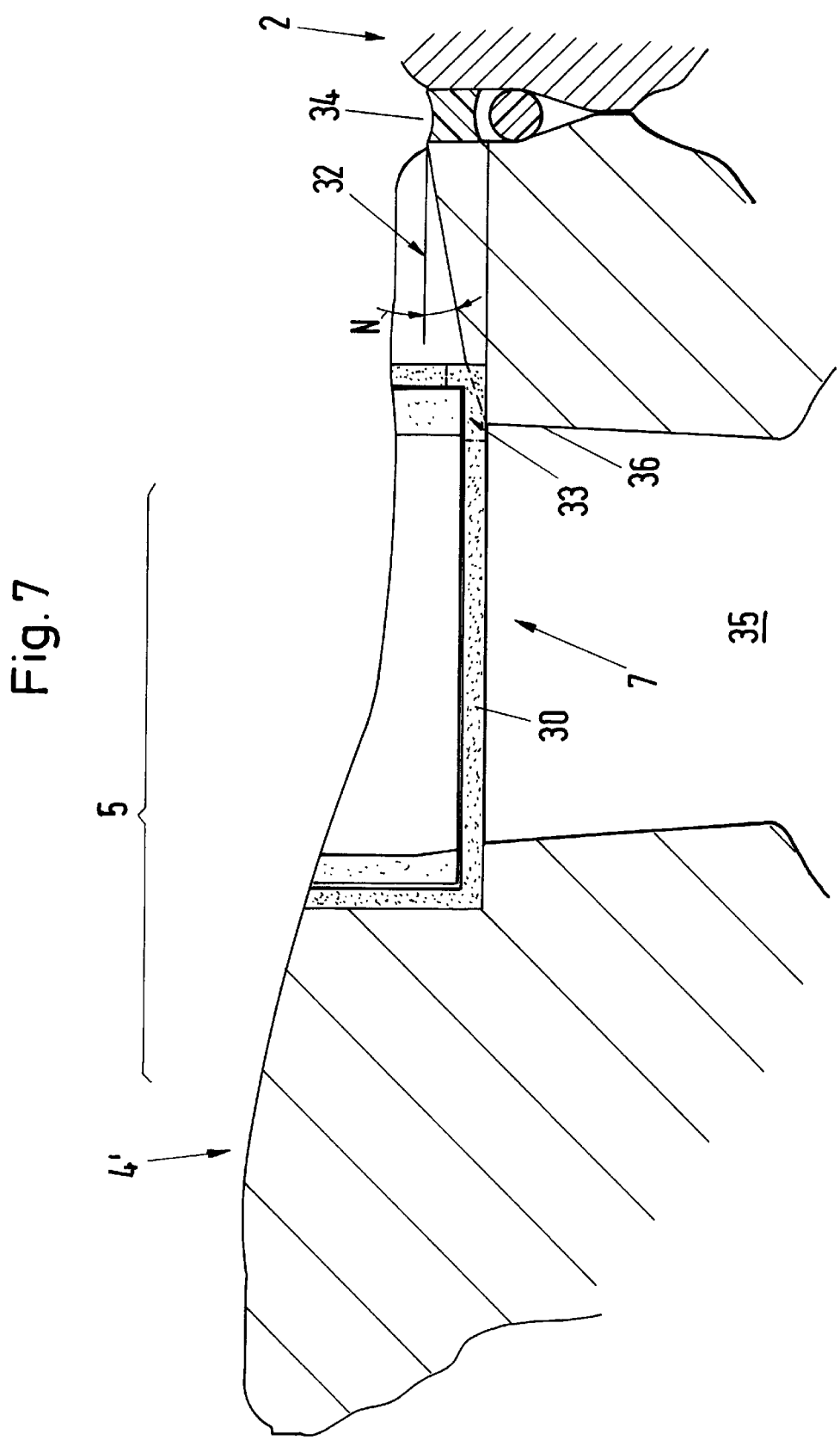

With this simple structural measure, liquid, such as surface water, diesel fuel, gasoline, etc., which is in a gutter region 34 of the sealed joint 23, is guided in such a manner, that an overflow to the support surface 5 of the concrete blocks 4,4' or the hexagonal blocks 2 is avoided and permanent discharge of the liquid into the inlet box 30 is achieved. In FIGS. 7 to 9, further embodiments of the inlet grooves 32 and 33 are illustrated, with which fluids that have leaked, particularly diesel fuel, are passed into a collecting container and/or separator 37, particularly in an area of a paved surface of gas stations as shown in FIGS. 10 and 11.

In FIG. 10, the concrete block 4' is illustrated in plan view, the support surface 5 of which is provided with three inlet grooves 32, 32', and 32", which extend in a direction of the roll profiling and act as liquid-guiding gutters. In addition, two inlet grooves 33, which are directed to a passage opening 35, are provided as a liquid trough transversely to the ramp profiling of the concrete block 4'.

The representation of FIG. 11 illustrates a concrete element 50 which is constructed as a concrete block with an inlet box and the joint 23 of which, which is closed off with the seal 24, in each case discharges into a groove region 51 forming a liquid-guiding gutter in such a manner, that liquids, guided over sealed joints 52 can reach the inlet box 7 over a short path and without further distribution on the support surface 5' of the concrete form element 50. With that, the support surface 5' at all times has a coating-free dry condition.

In FIGS. 12 to 14, concrete blocks 4" are illustrated in the position in which they are laid and are provided in each case with cross member regions 15', the contour of which is adapted to the respective roll profiling 13 in the region of the support surface 5 in such a manner that, for the prescribed drainage of liquid from the paved surface 1, optimally short duct systems to the respective inlet shafts 35 can be formed. In the embodiment of FIG. 12, the cross member region 15' is provided with an inclined region 55, which leads from the gutter region 34 to a groove shape 56, provided in a middle trough region of the roll profiling. On the other hand, a slope or arched contour region 57 of the cross member region 15' close to the side surface 17 discharges into this roll profiling. With this, an effective contour, which makes it possible to guide liquid optimally without disadvantageous collecting and backing-up spaces, is provided in the laid position for the whole cross member region 15'. Likewise, it is conceivable to form an intentional back-up space with the respective region of the cross member region 15' in the trough region of the roll profiling 13 as shown in FIG. 13.

In the representations of FIGS. 13 and 14, the cross member regions 15' are shown with different cross member heights 58, particularly in the region of the liquid-guiding gutter of the roll profiling. With this cross member height 58, which can be molded specifically by the way in which the concrete blocks are laid, the liquid-guiding gutter can be aligned by arranging such concrete blocks 4" side by side in an installed position extending perpendicular to the plane of the figure in such a manner that, in addition to the respective gutter region 34, the passage of liquid by the shortest path is possible and, with that, diesel fuel, which may leak out in the area of a gas station while a tank is being filled, is discharged from the support surface 5 with the least possible residence time and taken to the inlet box 7 and, with that, the disadvantageous penetration of the concrete surface structure is avoided.

The heights 58 or 60 and 61 of FIGS. 12 to 14 of the cross member 15', as peripheral molded region of the concrete block 4", can be dimensioned at a different distance from the support surface 5, so that, in regions of high load (for example, point K, point P), the joint region is protected particularly well.

The concrete block 4, 4', and 4" can be fixed in its installed position additionally by a screw connection and/or a dowel connection, this connection being provided below the region of the pavement 18 and/or the connecting surface formed, for example, by hexagonal blocks 2. With these connections, formed by supporting parts (not shown), movement of the concrete blocks, which could affect the tightness of the joints, is avoided and the reliability of the whole paved surface is ensured to be stable for a long time.

Referring to FIGS. 15 through 19, a paved surface formed of the hexagonal blocks 2, is illustrated, the paved surface being provided with an edge enclosure forming a shoulder 103. This shoulder 103 has several, essentially cuboid concrete blocks 104, which are arranged side by side and, in the form of a double ramp-shaped gutter block, are provided with a support surface with two partial surfaces 105, 105' forming a trough contour as shown in FIG. 19.

The detailed representations of the gutter block 104 of FIGS. 18 and 19 illustrate a construction which is symmetrical to a vertical central plane M and forms a central liquid-guiding gutter 112', which extends along the vertical central plane M between adjacent lower surface depressions 112, shown in FIG. 22, of the two adjacent, ramp-shaped part support surfaces 105, 105'. The apical surface regions K, K', formed by an elevation, and the surface depressions 19 along the edge can be seen in respective upper surface area 110 shown in FIGS. 20 to 22. Likewise, it is conceivable to provide the liquid-guiding gutter 112' in an asymmetrical construction (not shown).

Referring to FIGS. 16 and 17, the gutter block 104 has a rectangular outline contour and transverse side surfaces 116, 116', which are placed transversely to the direction of the liquid-guiding gutter 112', the transverse guiding surfaces 116, 116' being provided with tongue and groove profiling. A groove part 70 and a tongue part 71 are provided at each of the transverse side surfaces 116, 116'. They extend perpendicularly and in parallel in the respective transverse side surfaces 116, 116', opposite which the, in each case, similarly shaped tongue and groove parts 70, 71 are disposed diagonally offset to one another as shown in FIG. 18.

Figure 29:
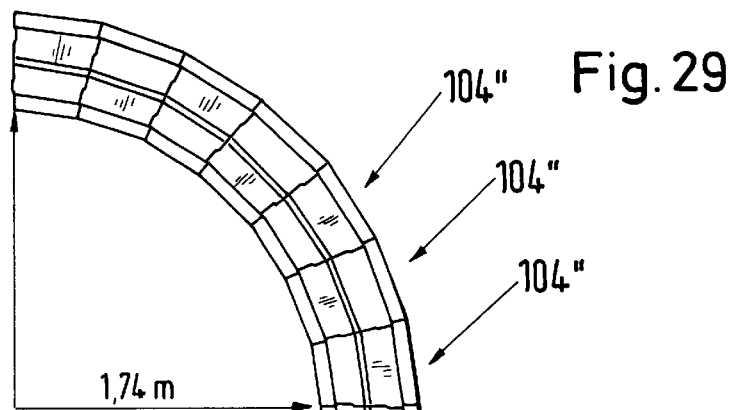
Figure 30:
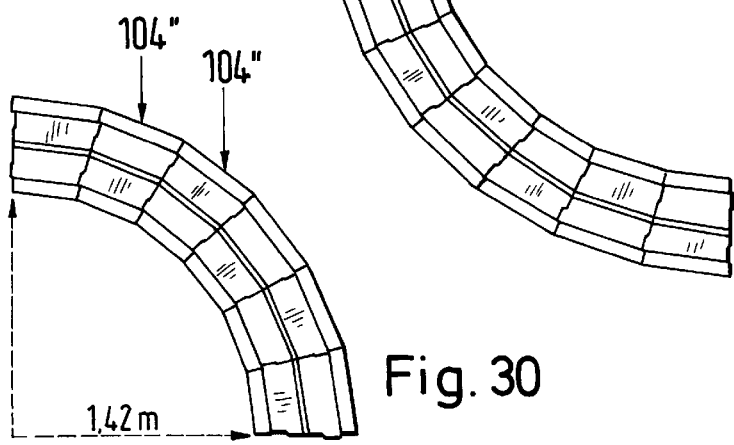

In FIGS. 23 to 28, different embodiments of the gutter block are shown, the latter being constructed as a rectangular block 104 shown in FIG. 23, a trapezoidal block 104" shown in FIGS. 25 to 28, or as a corner block 140' shown in FIG. 24. With these different gutter blocks, a kit is created, which can be used in various ways and with which contours with different arc radii, such as shown in FIGS. 29, 30 and 32, or different corner formations as shown in FIG. 31 for pavements, can be laid. This part of the pavement, together with the hexagonal blocks 2 forms, for example, the closed paved surface 1 of FIG. 15, so that the liquid-guiding gutter 112' extends in this paved surface 1 and, with that, surface drainage can be achieved.

In an appropriate embodiment, in the region of at least one of its transverse side surfaces 116, 116' and/or its longitudinal side surfaces (not shown), the trapezoidal gutter block 104" shown in FIGS. 25 to 28 is provided with an angle T, T', deviating from 90°, to the respective adjoining side surface 117 or 117', this angle T, T' in each case having a magnitude of 1° to 10° and preferably of 5°. In the case of the corner block 104' of FIG. 24, the liquid-guiding gutter 112' proceds over the corner region between the adjacent side surfaces 116, 117, these surfaces enclosing an angle preferably of 90°. Likewise, it is conceivable to provide only one of the side surfaces with the above-described inclinations T, T', so that an outline, similar to that of the laying examples of FIGS. 29 to 32, can be achieved, when the paved surface is laid appropriately.

The concrete blocks 104, 104', 104" have support surfaces 105, 105' shown in FIG. 22, which are shaped in the form of a ramp and in which the liquid-guiding gutter 112' can be provided in such a manner, that these blocks 104, 104', 104" make it possible to lay gutter blocks in a known manner, for example, for a rainwater gutter. In an improved and load-optimized shape, the inventive liquid-guiding gutter 112' is profiled in each of its embodiments in cross section in such a manner, that the support surface or surfaces 105, 105' in highly stressed pavements can absorb pressures when wheels roll over the blocks in any stressing direction and at any stressing point 20, so that the high stability requirements of a paved surface system, which is impervious for a long time, are fulfilled.

In an advantageous development, the known liquid-guiding gutter 112' is an integral component of the roll profiling and has at least one additional groove-shaped collecting gutter 72, the width and depth dimensions of which are such, that optimum drainage properties are attained on the support surface 105, 105' without affecting the strength values of the block. In FIGS. 16 and 17, a height E in the upper surface region 110 and a height E' in the region of the collecting gutter 72 are shown, these dimensions, which determine the strength, being defined in such a manner in relationship to one another that, in view of the overall strength of the concrete block, stress concentrations or notch effects are excluded in the region of the collecting gutter 72 and, even when the compressive stresses on the support surface 105, 105' are at a maximum, breakage of the block is avoided.

Figure 41:
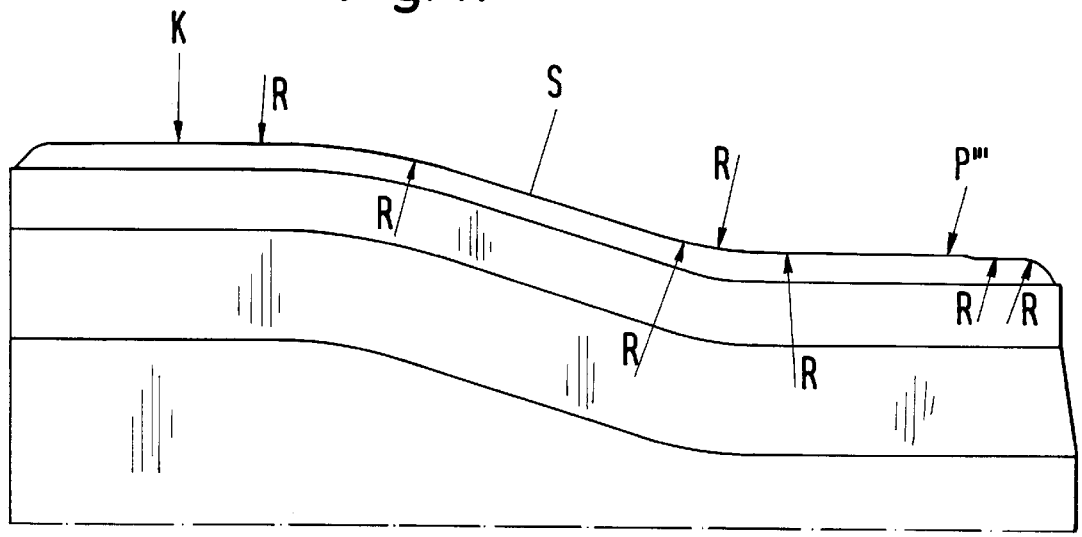
Figure 42:
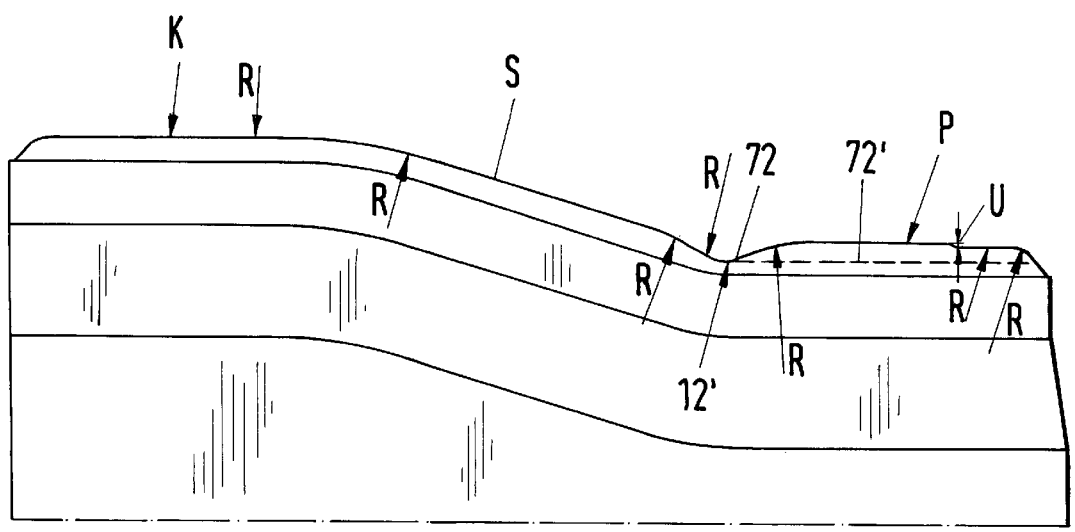
Figure 43:
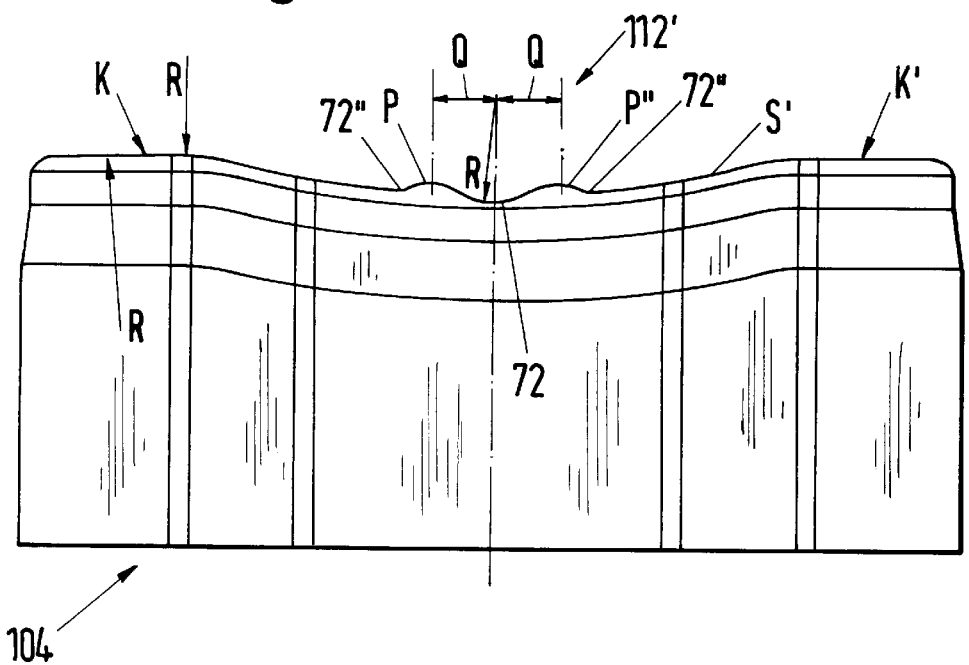
Figure 44:
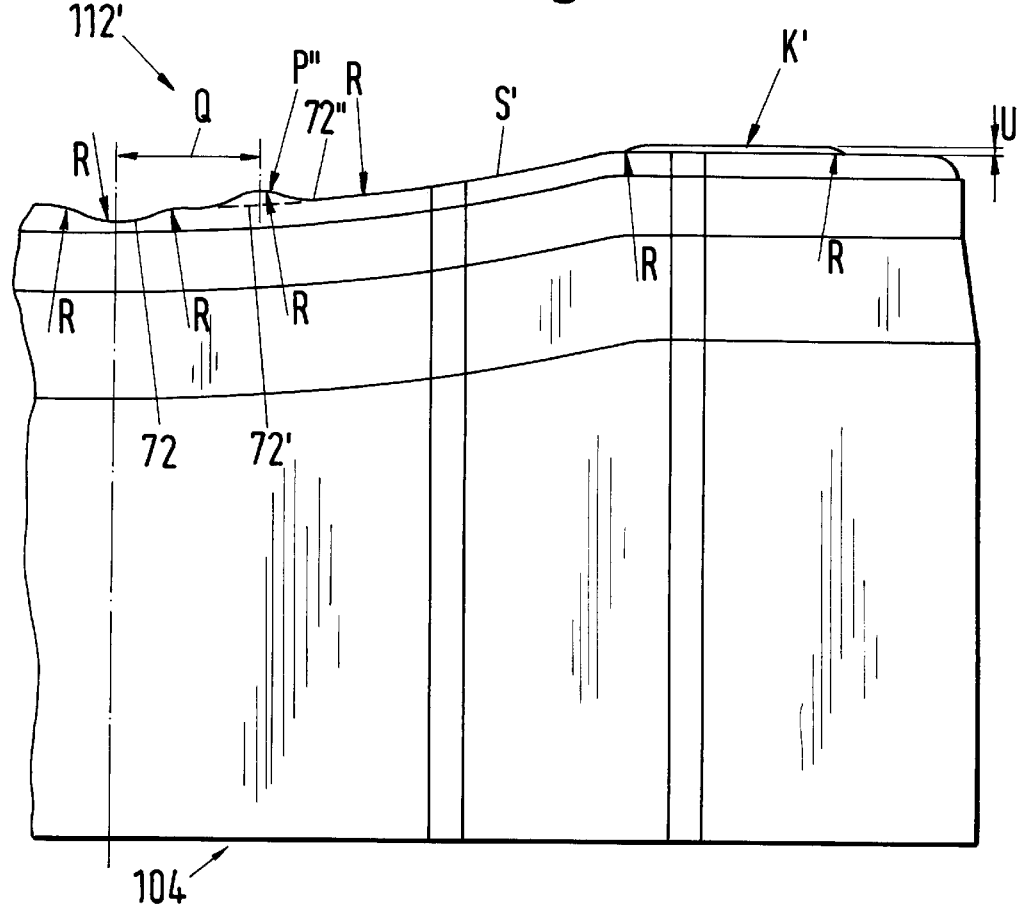

In the embodiments of the blocks 104, 104', 104" shown, the groove-shaped collecting gutter 72 in each case extends in the longitudinal direction of the liquid-guiding gutter 112'. It is also conceivable to provide adjacent collecting gutters 72', shown in FIGS. 22 to 44 by a dashed line, transversely to the liquid-guiding gutter 112'. These transverse collecting gutters 72' extend as openings in the lower apical surface region P to the respective sealed gutter 34 of FIG. 5 or to the main collecting gutter 72 FIGS. 43 and 44. The apical surface region P can be disposed at different distances Q, Q' from the middle longitudinal plane M, so that additional collecting gutters 72", corresponding essentially to the guiding gutter 12' of FIG. 12, are acting at the gutter block 104. In the construction of FIG. 41, an apical surface region P''' is provided in an inclined shape S without formation of a collecting gutter.

The perspective representation of FIG. 15 in conjunction with FIG. 1 illustrates the installed position of the concrete blocks 104, with their side surfaces 116, 117 adjoining a sealant 24 covering these side surfaces 116, 117 and a joint 123 with the adjacent block 2 fluid tight. Over an appropriate filling height or the respective distance from the support surface 105, 105', this sealant 24 defines a drainage duct system interacting with the surface depression 19 or U, the liquid-guiding gutter 112' and/or the collecting gutter 72, 72' between the respective concrete blocks 2, 104, 104', 104", so that the pavement 1 experiences permanent drainage and, even when there is a close sequence of vehicle loads or rolling processes, any unintentional entrainment of liquid residues, fuel portions and similar impurities is largely prevented, since even the very smallest liquid streams can be guided to the inlet box 7 with the passage opening 35 as shown in FIG. 15.

In FIG. 33, the concrete block 104 is shown with an integrated inlet box 7. In the region of the liquid-guiding gutter 112', a trough shape 74 with roll profiling, expanding in the longitudinal direction up to the inlet box 7, becomes clear. In this expanded trough shape 74, the collecting trough 72 is also provided and extends to the inlet box 7 with a slope (not shown), so that an improved guidance of liquid is attained. The expanded construction of the liquid-guiding gutter 112' in the vicinity of the inlet box 7 or in the passage opening 35 enables even larger amounts of liquid to be accommodated without hindrance and passed into the sewage system below the inlet box 7. In an appropriate construction, the inlet box 7 is covered with a grating 73, the upper side of which has a cross-sectional contour with roll profiling adapted to the support surface 105 of the concrete block 104, so that the block 104 with the inlet box 7 can be integrated in largely any position in the kit system.

In FIG. 35, a concrete block 304, which is in the form of a double ramp block 80 and provided to complete the kit, is illustrated diagrammatically in a perspective representation. The concrete block 304 is constructed with a common upper surface area 110', which extends in a region of a central longitudinal plane M of the concrete block 304 and at which the middle and lower surface regions 111, 112, shaped in accordance with the above-described roll profiling, adjoin and change over at the edges in each case into the surface depressions (not shown), which are provided for edge protection.

In FIGS. 36 and 37, the concrete block 304 is shown in two further embodiments, which have support surfaces 105, which are formed with a slope in the longitudinal direction and form at one end a step-free horizontal surface region 75 in the longitudinal direction of the block. A plan view of the installed position of the concrete block 304 with the horizontal surface 75 is illustrated in FIG. 34. On the one hand, a stepless corner formation is attained to an adjoining pavement surface 76 by means of this special surface form, on the other, the horizontal surface 75 extends in the same plane as the upper surface region 110 of the adjoining edge border blocks 104. Likewise, it is conceivable to shape the horizontal surface region 75 so that this region 75 extends in the same plane as the lower surface region 112 of an adjoining block (not shown).

In FIGS. 38 to 40, further concrete blocks are illustrated diagrammatically and, with essentially identical length and width dimensions as well as the height difference from HI to H2, illustrate the advantageous block forms for the kit. The block shown in FIG. 39, is provided in the region of its ramp-shaped support surface with upper and middle surface regions 110, 111, which form a corner angle 77, 77' of preferably 90°, so that, as in FIG. 31, it is possible to lay the blocks of the kit with a corner configuration having the roll profile.

In FIGS. 45 to 47, a ramp block 404, starting out from the one-piece embodiment of FIG. 45, is shown in a two-part construction with the parts 404.1 and 404.2, which can be laid individually. These part blocks 404.1 and 404.2 make possible the above-described construction of the surface contour of the liquid-guiding system, the action of the respective block contours being similar to those of FIGS. 12 to 14, for draining surfaces with a flow direction F.

Advantageously, these partial blocks 404.1 and 404.2 can be used on subsoils, which are unstable and still carry out slight settling motions. This is possible, for example, in the area of covered garbage dump surfaces or the like. In this case, the joint 23, closed off with sealant, forms protection against surface water as well as against rising liquids and the elasticity of the sealant 24 can also compensate for the movements of the unstable subsoil, so that the sealing of the paved surface 1, protected against breakage of gutter blocks and/or ramp blocks, is stabilized with the blocks 404, 404.1 and 404.2 for a prolonged period and the paved surface 1 withstands stresses and can be driven over in any direction.

What is claimed is:

1. A construction block comprising:

a block having as a top surface a contoured support surface, and first and second side surfaces opposing one another;

said contoured support surface having an upper surface region, a central surface region which is inclined relative to horizontal to form a ramp, and a lower surface region;

a first apical portion at a junction of said upper surface region and said central surface region, said first apical portion being disposed higher than remainders of said upper surface region and said central surface region;

said upper surface region having at least an upper region depressed portion extending substantially horizontally flat from said first apical portion toward said first side surface; and said lower surface region having a gutter portion juxtaposed to said central surface region at a first side thereof and extending to and joining a lower region depressed portion via a second apical portion, apical with respect to at least said lower region depressed portion, said lower region depressed portion extending substantially horizontally flat from than said second apical portion toward said second side surface and being lower than said second apical portion.

2. The construction block according to claim 1 wherein said central surface region and said gutter portion have an inclined S-shaped configuration with said central surface region being convex and said gutter part being concave.

3. The construction block according to claim 1 wherein said central surface region includes a central region convex surface juxtaposed to said first apical portion, the highest elevation of said central region convex surface being substantially at the same elevation as said first apical portion.

4. The construction block according to claim 1 wherein said second apical portion has a convex surface.

5. The construction block according to claim 1 wherein said central surface region is a generally convex surface and said gutter portion is a generally concave surface, said concave surface being joined to said convex surface at a point of inflection, said point of inflection being spaced from said first and second apical portions.

6. The construction block according to claim 1 further comprising:

a first rounded corner between said upper surface region and said first side surface; and a second rounded corner between said lower region depressed portion and said second side surface.

7. The construction block according to claim 1 wherein further comprising an inlet drainage box disposed in said block and said block defining a passage opening in communication with said inlet drainage box for draining liquid therefrom.

8. The construction block according to claim 7 further comprising a grating disposed over said inlet drainage box, said grating having a contour conforming to at least a portion of said gutter portion.

* * * * *